(12) United States Patent
Buxton et al.

(10) Patent No.: US 9,383,439 B2
(45) Date of Patent: Jul. 5, 2016

(54) DETECTION OF CONDUCTIVE MATERIAL IN A THIN FILM

(71) Applicant: Federal Bureau of Investigation, Washington, DC (US)

(72) Inventors: Carey G Buxton, Spotslyvania, VA (US); John Scott Huggins, Warrenton, VA (US)

(73) Assignee: The United States of America as represented by the Federal Bureau of Investigation, Dept. of Justice, Washington, DC (US)

( * ) Notice: Subject to any disclaimer, the term of this patent is extended or adjusted under 35 U.S.C. 154(b) by 66 days.

(21) Appl. No.: 14/317,414

(22) Filed: Jun. 27, 2014

(65) Prior Publication Data

US 2015/0002172 A1 Jan. 1, 2015

Related U.S. Application Data

(60) Provisional application No. 61/840,169, filed on Jun. 27, 2013.

(51) Int. Cl.
*G01R 27/02* (2006.01)
*G01S 13/04* (2006.01)
*G01V 3/12* (2006.01)

(52) U.S. Cl.
CPC .. *G01S 13/04* (2013.01); *G01V 3/12* (2013.01)

(58) Field of Classification Search
CPC .......... G06K 19/0723; G06K 7/10356; G06K 7/10386; G06K 7/10178; G06K 7/10336; G06K 7/10346; H04B 1/707; H04B 5/0062; H04B 1/44; H04B 7/10; H04B 13/00; H04B 1/18; H04B 1/48; H04B 5/0056; H04B 7/06; H04B 1/04; H04B 1/0458; H04L 5/14; H04L 27/2003; G01S 13/04; G01S 13/74; G01S 13/753; G01S 7/354; G01S 13/70; G01S 13/825; G01S 13/885; G01S 13/106; G01S 13/56; G01S 13/583; G01S 13/586; G01S 13/90; G01S 7/006; G01S 7/288; G01S 7/414; G01S 13/345; G01S 13/282; G01S 13/343; G01S 13/44; G01S 13/584; G01S 13/726; G01S 13/876; G01S 13/88; G01S 13/9035; G01S 7/024; G01S 7/038; G01S 7/285; G01S 7/35
See application file for complete search history.

(56) References Cited

U.S. PATENT DOCUMENTS 2,803,341 A 8/1957 Schneider et al.
3,209,245 A 9/1965 Hauge
(Continued)

OTHER PUBLICATIONS

Website article entitled "Window Film," by Merle Henkenius, on http://www.coraltint.com/different-type.html (Jul. 26, 2008).

*Primary Examiner* — Vinh Nguyen
(74) *Attorney, Agent, or Firm* — Kristin K. Vidovich

(57) ABSTRACT

Provided are products used to detect and methods for detecting conductive materials in the presence of non-conductive materials, including non-conductive materials having dielectric properties. Specifically, the product is a conductive thin film detector, which is, preferably, a hand-held device designed to detect the presence of metal in, on, or under an object. This detection occurs even in the presence of non-conductive materials and other nearby conductive materials on objects that are not being tested. The device preferably includes: a power source, such as a battery; a method for activation, such as a press button; the necessary components to send and receive a radio frequency, e.g., a radio frequency generator, an antenna, and a radio frequency detector; and an indicator, such as a light or a meter, to, for example, indicate the strength of the radio frequency signal received.

12 Claims, 31 Drawing Sheets

(56) References Cited

U.S. PATENT DOCUMENTS

| | | | |
|---|---|---|---|
| 3,769,575 A | 10/1973 | Rist et al. | |
| 3,823,365 A | 7/1974 | Anderson | |
| 4,099,118 A | 7/1978 | Franklin et al. | |
| 4,234,844 A | 11/1980 | Yukl | |
| 4,325,027 A | 4/1982 | Dykstra et al. | |
| 4,358,731 A | 11/1982 | Steinbrecher | |
| 4,678,992 A | 7/1987 | Hametta | |
| 4,709,213 A | 11/1987 | Podhrasky | |
| 4,894,618 A | 1/1990 | Candy | |
| 4,949,037 A | 8/1990 | Abe | |
| 5,028,870 A | 7/1991 | Reed | |
| 5,334,981 A | 8/1994 | Smith et al. | |
| 5,506,506 A | 4/1996 | Candy | |
| 5,521,583 A | 5/1996 | Frahm et al. | |
| 5,691,640 A | 11/1997 | King | |
| 6,121,925 A * | 9/2000 | Hilliard | H01Q 21/0025 342/374 |
| 6,359,582 B1 | 3/2002 | MacAleese et al. | |
| 6,501,414 B2 | 12/2002 | Arndt et al. | |
| 6,633,254 B1 * | 10/2003 | Sutphin | G01S 7/006 340/541 |
| 6,784,854 B1 | 8/2004 | Yukl | |
| 6,950,054 B1 | 9/2005 | Steinway et al. | |
| 7,064,701 B2 | 6/2006 | Steinway et al. | |
| 7,518,542 B1 | 4/2009 | Steinway et al. | |
| 7,683,822 B2 | 3/2010 | Danilov et al. | |
| 7,898,456 B2 | 3/2011 | Cloutier et al. | |
| 7,956,794 B2 | 6/2011 | Skultety-Betz et al. | |
| 7,994,478 B2 | 8/2011 | Kurosaka et al. | |
| 8,120,456 B2 | 2/2012 | Simon | |
| 2004/0214598 A1 | 10/2004 | Rajamma | |
| 2006/0035600 A1 * | 2/2006 | Lee | H04B 1/18 455/78 |

* cited by examiner

DETECTION OF CONDUCTIVE MATERIAL IN A THIN FILM

STATEMENT OF GOVERNMENT INTEREST

The invention described herein was invented by employees of the United States Government and may be manufactured and used by or for the government for governmental purposes without the payment of any royalties.

BACKGROUND

1. Field

The field of the present invention relates to novel methods for detecting and products used to detect the presence of conductive materials, including in the presence of non-conductive materials, wherein the non-conductive materials may have dielectric properties. In addition, the methods and products of the invention detect the presence of specific conductive materials even in the presence of other conductive materials nearby.

2. Background

Conductive Thin Films

Conductive materials include metals, electrolytes, and plasmas, as well as certain non-metallics, such as graphite and conductive polymers. Often, conductive materials are formed into a thin film and coated onto glass or ceramics. For example, conductive thin films are often added to windows to save energy by transmitting visible light and, at the same time, reflecting infrared energy. Conductive thin films can even be used to electronically defrost window panes. In addition to saving energy, conductive thin films block ultraviolet rays, provide shatter resistance, and, when appropriately tinted, provide privacy in, for example, a vehicle or other enclosure.

Thin films generally contain a polyester base made up of at least one layer. More often, the base contains multiple polyester layers bonded together. The polyester material serves multiple purposes, such as acting as a sunlight barrier and reflecting heat.

In addition to the polyester layer or layers, conductive thin films used on windows in vehicles, offices, and houses contain other components. For example, a mounting adhesive may be added to the side of the film next to the window glass and the other side may have a scratch-resistant hardcoat. In addition, if dye technology is used to add the thin film to window glass, then the polyester layer contains a dye, which absorbs heat.

An alternative method used to add a conductive thin film to window glass involves deposition technology, which requires vacuum coating and metalizing. Another method, known as sputtering, involves advanced metalizing. Both deposition and sputtering technologies require deposition of a layer of metallic particles onto the polyester base. Yet another method combines metallic particles and dyes to create a hybrid thin film.

There are many different formulations for thin films and these formulations fall into one of two categories—metallic or non-metallic. Because there are non-metallic thin films that appear metallic and metallic thin films that appear non-metallic, a person cannot determine from visual observation whether a thin film is metallic. However, such a determination is necessary in certain areas, such as antenna performance. For example, antennas are often used in vehicles that have tinted windows or in office buildings with tinted windows, wherein the tinting is in the form of a thin film. If the tinting is metallic, it will severely degrade the performance of an antenna. If the tinting is non-metallic, it will have very little effect on the performance of an antenna.

Metal Detection Techniques

Metal detection has been used to discern the location of objects in various situations. Traditional uses include locating metallic objects of interest in soil or sand and detecting weapons at security screening locations. The common methods used in metal detection are the beat frequency oscillator (BFO), very low frequency (VLF), and pulse induction (PI) methods, which all have a broad sensing area.

Beat frequency oscillator (BFO)-based metal detection methods employ two coils, a search coil and a reference coil, which are placed at a distance from one another such that they do not interfere with one another. When metal objects come close enough to the search coil to detune it and change its frequency, the difference between that frequency and the reference coil's frequency creates a tone indicating the presence of metal. Thus, BFO methods rely on a tone that varies depending on a metallic object's size and distance away from the search coil. It is the simplest method, but the least sensitive to specific objects, especially in conductive surroundings. For example, if BFO equipment is used to detect whether metal is incorporated into a thin film coated on a car window, the metal of the car would dominate the response from the BFO equipment and cause a high false detection rate.

The very low frequency (VLF)-based metal detection methods are similar to the BFO methods in theory of operation. The VLF methods rely on co-locating send and receive coils. Although VLF methods offer improved sensitivity and discrimination between metals and dielectrics, when compared to BFO-based methods, they rely on the detuning effect of metallic or dielectric objects on or near the coils, which are operated at relatively low frequencies. Thus, the presence of a nearby large metal object, such as a car, would cause a high false detection rate.

Pulse induction (PI)-based methods use a single coil to transmit and receive frequencies. The coil is charged and then discharged relatively quickly. A receiver "listens" for a reflected ringing signal from metallic objects in the surrounding environment. Again, however, large metallic objects in relatively close proximity to the object being measured would generate a high false detection rate.

These standard methods of metal detection rely on detecting a large change in the parameters of the circuit components when approaching a small metal object, thus they are designed to operate in mostly non-metallic environments to avoid the potential of large metal objects swamping the desired signal and causing a high false detection rate.

BRIEF SUMMARY

There is a need for products that detect and methods of detecting conductivity in a material, regardless of whether that material is in the vicinity of other conductive materials. There is also a need for products that detect and methods of detecting conductivity in a material, regardless of whether that material is in the vicinity of non-conductive materials, including non-conductive materials having dielectric properties. More specifically, there is a need for products that detect and methods of detecting conductivity in a thin film formulation, regardless of the other materials in the vicinity of the thin film.

More specifically, there is a need for a small, hand-held, battery-operated device that can identify whether window tinting or other type of thin film is metallic or non-metallic, especially since known methods of detecting conductive thin films do not discriminate between, for example, the metallic film on a car window and the metal on the car.

To meet this need, the present invention is directed to products and methods for the detection of conductive materials in, for example, a thin film formulation, even in the presence of non-conductive materials having dielectric properties or in the presence of conductive materials that are not being tested. The electromagnetic interactions of the conductive materials in the material being tested are detected using a device comprising electromagnetic equipment, such as a power source, radio frequency (RF) generator, RF detector, and wide bandwidth, i.e., wideband, antenna. The novel single frequency technique used in the preferred process provides information to the operator of the device about conductivity in the object being tested, yet ignores the properties of glass, plastic, or other non-conductive material surrounding the object of interest and also ignores nearby conductive objects. Thus, detection of the presence of a conductor in a thin film formulation coating a car window is not affected by the dielectric properties of the automotive glass, or by the conductive characteristics of the metal on the car.

To generate such accurate detection capabilities, the invention employs higher radio frequencies than used in previous metal detection techniques. The higher frequencies condense an antenna's near-field region, thus allowing for less interference from surrounding metallic objects, and facilitate the use of a smaller antenna, which, in turn, contributes toward packaging the inventive detector into a small, hand-held unit for easy deployment and use.

In specific embodiments, the invention employs a wideband antenna, which prevents the antenna from significantly detuning in the presence of a dielectric material. The dielectric material does cause a change in antenna tuning, but the antenna bandwidth is sufficiently broad such that any change in antenna performance is negligible. Thus, the dielectric material has little effect on the wideband antenna, which reflects little energy back toward the RF detector and yields high values of return loss.

In one embodiment, the invention is directed to a conductivity detector comprising: a power source, such as a battery; an RF generator; an RF directional coupler; a wideband antenna; an RF detection circuit; and an operator interface or display. The RF directional coupler may be an RF circulator (referred to herein as a circulator or an RF circulator) or any circuit that routes energy reflecting back from the antenna to a different port. The RF detection circuitry and the operator interface or display may be selected based on what is well-known in the art.

In another embodiment, the invention is directed to a metallic conductivity detector comprising: a power source, an RF generator, an RF directional coupler, a wideband antenna, a diode or integrated circuit RF detector, and a display indicator. Additional components include, but are not limited to, an operational amplifier, a current mirror, and a threshold detector if the indicator is an off/on indicator.

The RF circulator, RF detector, and indicator together reduce the measured data to a "yes" or "no" status regarding the presence of conductive material for easy interpretation by the operator. Thus, the invention provides an instant response to the operator as to the presence or absence of conductive material.

In another embodiment, the invention is directed to a conductive thin film sensor for electromagnetically sensing conductive materials surrounded by other conductive materials, comprising: a power source in series with an actuator switch in series with an RF oscillator and an RF amplifier, in series with an RF circulator with the first clockwise port in series with a wideband antenna and the second clockwise port in series with a termination load in series with an RF detector in series with a metal detection indicator.

In an alternative embodiment, the RF detector comprises a diode in series with a capacitor and resistor in parallel, then in series with a termination load in series with ground; or the RF detector comprises an integrated circuit assembly, which rectifies the RF signal and outputs a voltage in proportion to the radio signal strength.

In another alternative embodiment, the detection indicator is a light emitting diode (LED) or a meter movement.

The invention is also directed to methods for detecting conductive material enclosed in or in the vicinity of non-conductive dielectric materials, comprising: (a) employing a system, comprising: a single source of radio frequency energy coupled to an RF directional router coupled to a wideband antenna and an RF detector, and a signal detection indicator; (b) generating a single RF signal from the single source of radio frequency energy; (c) guiding the signal from the source via the RF directional router to an antenna port; (d) radiating the RF signal via the wideband antenna of sufficient bandwidth; (e) guiding the signal from the wideband antenna to the RF detection circuit via the RF directional router; (f) converting the RF signal via the RF detection circuit to a signal strength indicator viewable by the operator; and (g) assessing, based on the indicator, whether conductive material is present.

In an alternative embodiment, the RF directional coupler may be an RF circulator assembly or an RF directional coupler assembly and the RF detection indicator may be a viewable meter movement or a viewable illuminated indicator representing signal strength.

In another alternative embodiment, in the method of detecting electrically conductive material enclosed in or in the vicinity of non-conductive dielectric material, the RF detection circuit feeds a comparator for detection of signal strength above a set threshold.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the relevant art(s) to make and use the invention.

FIG. 2a illustrates the response of a narrowband antenna in freespace with no conductive or dielectric material near the antenna. Freespace is the condition where an antenna is surrounded by air or in a vacuum with only the attached feedline in its near-field. The width of the return loss dip in the graph illustrates the operating bandwidth of the dipole antenna. The dip in the return loss graph suggests that the antenna is transmitting energy at a frequency of approximately 1220 MHz. The threshold value used to indicate an antenna's bandwidth is generally −10 dB and the data crossing the −10 dB point sets the lower and upper values of the antenna's operating range. In this figure, and using the −10 dB value, the dipole antenna transmits energy from approximately 1145 MHz to approximately 1280 MHz, suggesting that the bandwidth of this dipole antenna is about 135 MHz and centered at about 1213 MHz.

FIG. 2b illustrates the response of a narrowband dipole antenna when a sheet of electrically conductive material is placed next to the antenna. The return loss graph illustrates that most of the energy reflects back to the source. The lack of a characteristic dip in the return loss response suggests that the antenna is significantly detuned in the presence of the electrically conductive material. Thus, the return loss is essentially flat across all the frequencies. This graph reveals that the narrowband antenna detects the presence of conductive material.

FIG. 2c illustrates how the resonant frequency of a narrowband antenna drops in the presence of a dielectric material by showing the response of a narrowband dipole antenna when a sheet of plate glass material is placed next to the antenna. The dip in the return loss graph illustrates that the antenna transmits energy at a frequency of approximately 1060 MHz. Using the −10 dB value to discern the antenna's operating bandwidth, the dipole antenna next to the glass dielectric material transmits energy from approximately 1015 MHz to approximately 1135 MHz suggesting that the bandwidth of the dipole antenna next to glass is approximately 120 MHz centered at about 1075 MHz. The lowering of the resonant frequency of this narrowband dipole antenna by about 160 MHz in the presence of dielectric loading reflects fundamental antenna behavior. FIGS. 2a and 2c reveal how narrowband antennas are not immune to the presence of dielectric materials and will produce a false detection, because there is no single frequency where the return loss value remains constant with the narrowband antenna in freespace or next to a glass dielectric.

FIG. 2d illustrates the effect of sensing the conductive material, i.e., metal in FIG. 2d, through glass by showing the response of a narrowband dipole antenna when a sheet of plate glass material is placed between the antenna and conductive material. This simulates the condition where a window has a conductive film. The return loss behavior matches almost perfectly the behavior of the conductive material in FIG. 2b. The graph reveals the presence of the conductive material without regard to the presence of the dielectric glass material.

FIG. 3a illustrates the response of a wideband antenna in freespace with no conductive or dielectric material near the antenna. The dip in the return loss graph suggests that the wideband antenna is transmitting energy starting at a frequency of approximately 1150 MHz. Unlike the narrowband dipole antenna response in FIG. 2a, the wideband antenna transmits energy from about 1150 MHz to past about 2000 MHz. Thus, the bandwidth of the wideband antenna is at least about 850 MHz.

FIG. 3b illustrates the response of a wideband antenna when a sheet of electrically conductive material is placed directly next to the antenna. The return loss graph suggests that almost all the energy reflects back to the source. The lack of a characteristic dip in the return loss response suggests that the antenna significantly detuned in the presence of the electrically conductive material. Thus, the return loss is essentially flat across all the frequencies. This graph reveals that the wideband antenna detects the presence of conductive material.

FIG. 3c illustrates how the signal returned from a wideband antenna remains low in the presence of dielectric material. The figure depicts the response of a wideband antenna when a sheet of plate glass material is placed next to the antenna. The dip in the return loss graph suggests that the antenna transmits energy starting at a frequency of about 1055 MHz. Using the −10 dB value to discern the antenna's operating bandwidth, the wideband antenna next to a glass dielectric material transmits energy from approximately 1055 MHz to approximately 2000 MHz suggesting that the bandwidth of the wideband antenna next to glass is at least about 945 MHz. The lowering of the resonant frequency by about 95 MHz of the wideband antenna in the presence of dielectric loading reflects fundamental antenna behavior. FIGS. 3a and 3c reveal how wideband antennas are not immune to the presence of dielectric materials, but, because of the wide bandwidth, i.e., many frequencies, they will not produce a false detection and the return loss value will remain constant.

FIG. 3d illustrates the effect of sensing conductive material, i.e., metal in FIG. 3d, through glass. Specifically, it depicts the response of a wideband antenna when plate glass is placed between a wideband antenna and a conductive material. This simulates the condition where a window has a conductive film. The return loss behavior matches almost perfectly the behavior of the conductive material in FIG. 3b. The graph reveals the presence of the conductive material without regard to the presence of the dielectric glass material.

In FIG. 4a, this reflected energy flows back to the directional RF splitter (13) and flows toward the RF detector (7). The RF detector (7) discerns the value of return loss. Thus, it is clear that the conductive material effectively shorts the narrowband antenna (11) causing a maximum return of the signal from the antenna (11).

FIGS. 4a and 4b illustrate how a single frequency metal detector system using a narrowband antenna (11) cannot discern between conductive metal (12) and dielectric material (14), and thus, has a false positive conductor detection in the presence of a dielectric.

In FIG. 5a, this reflected energy flows back to the directional RF splitter (13) and flows toward the RF detector (7). The RF detector (7) discerns the value of return loss. Thus, it is clear that the conductive material (12) effectively shorts the wideband antenna (9) causing a maximum return of the signal from the antenna (9).

In FIG. 5b, the minimal reflected energy flows back to the directional RF splitter (13) and flows toward the RF detector (7). The RF detector (7) discerns the value of return loss. As seen in FIG. 3c, the dielectric material (14) moves the antenna's tuning point below the original frequency, but, due to the wide bandwidth, the wideband antenna (9) still accepts and radiates energy, thereby causing minimal return of the signal from the wideband antenna (9). Thus, the wideband antenna (9) prevents the false detection of conductive material (12) in the presence of a dielectric material (14).

FIG. 6a has a sine wave source (G1) feeding an RF circulator (HY1), which feeds a wideband antenna (E1). Any RF energy reflecting back from the wideband antenna (E1) is routed by the RF circulator (HY1) to a 50 ohm load (R1). A diode (D1), capacitor (C1), and resistor (R2) demodulate, or convert, the RF alternating current into dc voltage representing the strength of the signal reflected from the wideband antenna (E1). The amplifier (AR1) increases the reflected signal strength voltage to the level appropriate for viewing on a meter (M1). The meter movement is proportional to the strength of the RF signal reflecting from the wideband antenna (E1). In this way, the meter movement indicates to the operator the presence or absence of a conductive material next to the wideband antenna (E1).

FIG. 6b is similar to FIG. 6a, except that the return signal strength voltage is compared with a set threshold comparator (U1) to provide a digital on/off indication on a light emitting diode (LED) (DS1). The circuit in FIG. 6b replaces the meter (M1) in FIG. 6a with a threshold comparator (U1) and an LED (DS1). The comparator monitors the varying voltage from the amplifier (AR1) and compares it with a fixed voltage threshold. If the voltage from the amplifier (AR1) is below the threshold, the comparator (U1) turns the LED (DS1) off. If the voltage from the amplifier (AR1) is above the threshold, the comparator (U1) turns the LED (DS1) on. In this way, a simple on/off indicator combined with the rest of the circuit reveal the presence or absence of a conductive material next to the wideband antenna (E1).

FIG. 9a illustrates the return loss of a wideband antenna next to glass.

FIG. 9b illustrates the return loss of a wideband antenna next to non-conductive window film sample A.

FIG. 9c illustrates the return loss of a wideband antenna next to non-conductive window film sample B.

FIG. 9d illustrates the return loss of a wideband antenna next to non-conductive window film sample C.

FIG. 10a illustrates the return loss of a wideband antenna next to metal.

FIG. 10b illustrates the return loss of a wideband antenna next to conductive window film sample D.

FIG. 10c illustrates the return loss of a wideband antenna next to conductive window film sample E.

FIG. 10d illustrates the return loss of a wideband antenna next to conductive window film sample F.

FIGS. 11a-11d illustrate return loss values for a single frequency in the operating range of about 1220 to about 2000 MHz. This particular test uses the frequency of about 1800 MHz to demonstrate how the invention works when a wideband antenna is directly next to or offset from the material being tested. Two non-conductive and two conductive test materials comprise the four samples. Each test measures the return loss value at about 1800 MHz versus distance between the antenna and the material.

FIG. 11a illustrates a return loss value of a wideband antenna at about 1800 MHz versus distance between the antenna and glass. The antenna senses the dielectric properties of the glass, but the return loss is always about 20 dB or greater suggesting that the wideband antenna successfully avoids a false positive detection of conductive material and can do so at a length of up to about two inches away.

FIG. 11b illustrates a return loss value of a wideband antenna at about 1800 MHz versus distance between the antenna and plastic. The antenna senses the dielectric properties of the plastic, but the return loss is always about 20 dB or greater suggesting that the wideband antenna successfully avoids a false positive detection of conductive material and can do so at a length of up to about two inches away.

FIG. 11c illustrates a return loss value of a wideband antenna at about 1800 MHz versus distance between the antenna and metal. The antenna senses the conductive properties of the metal with a return loss of about 16 dB or lower out to about two inches or of about 10 dB or lower out to about one inch. This suggests that the wideband antenna successfully detects the conductive material and can do so at a length of up to about two inches away using a threshold of about 16 dB or up to about one inch away using a threshold of about 10 dB.

FIG. 11d illustrates a return loss value of a wideband antenna at about 1800 MHz versus distance between the antenna and conductive window thin film. The antenna senses the conductive properties of the conductive film with a return loss about 14 dB or lower out to about two inches or of about 9 dB or lower out to about one inch. This suggests that the wideband antenna successfully detects the conductive material and can do so at a length up of to about two inches away using a threshold of about 14 dB or up to about one inch away using a threshold of about 9 dB.

Figure 1:
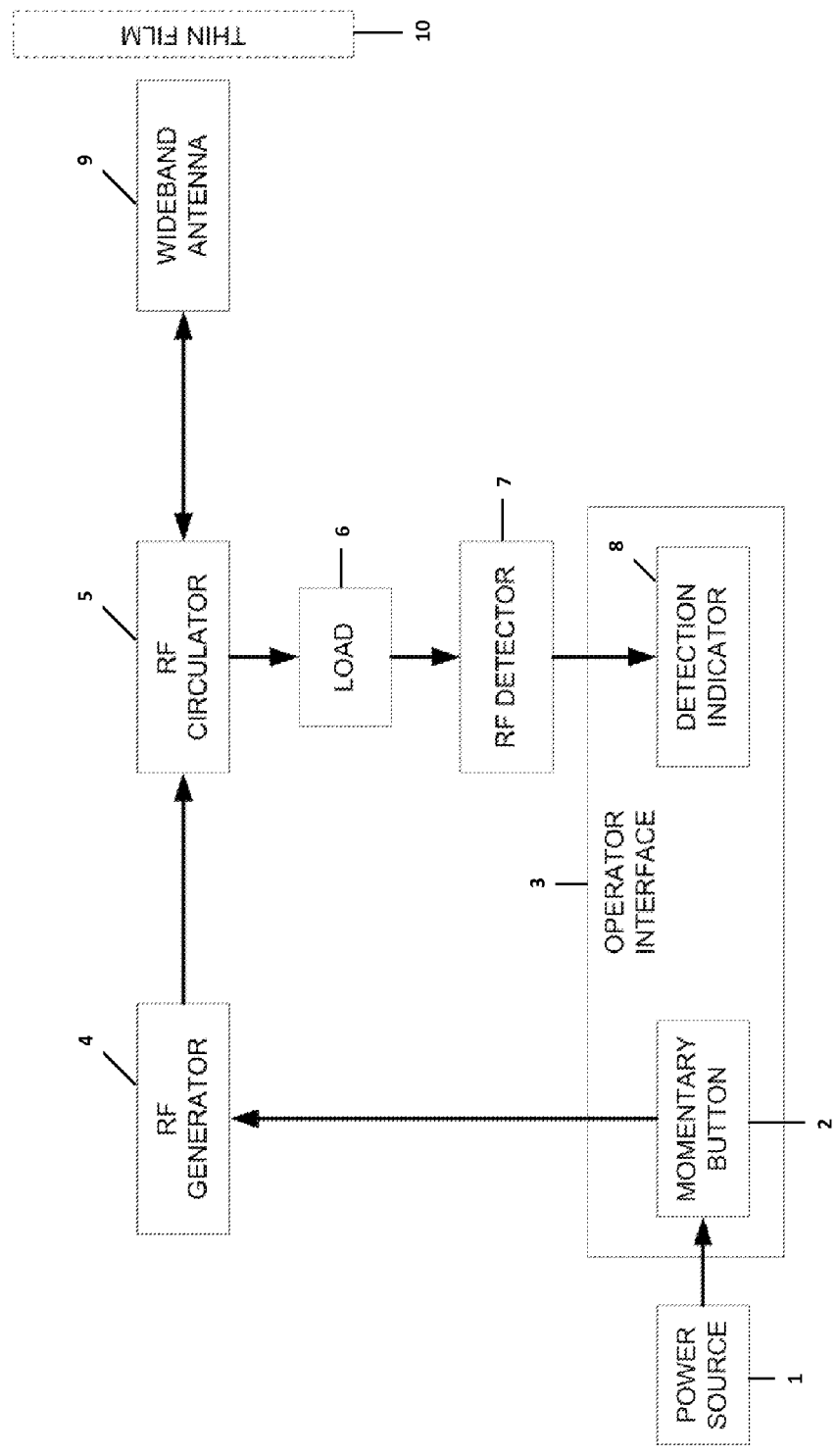
FIG. 1 represents a diagram of components in one embodiment of the inventive conductive thin film detector, wherein a power source (1) powers a momentary button (2), which activates a transmitter, e.g., RF sine wave generator (4), which sends energy though an RF circulator (5) toward a wideband antenna (9). Energy reflecting back from the wideband antenna (9) is routed by the RF circulator (5) toward an RF load (6) and then an RF detector (7), where further processing yields a detection indication (8) on an operator interface (3) to the operator of the presence or absence of a thin film (10). The wideband antenna (9) provides the detector with immunity to dielectric loading from non-conductive materials, such as plastic and glass.
Figure 2A:
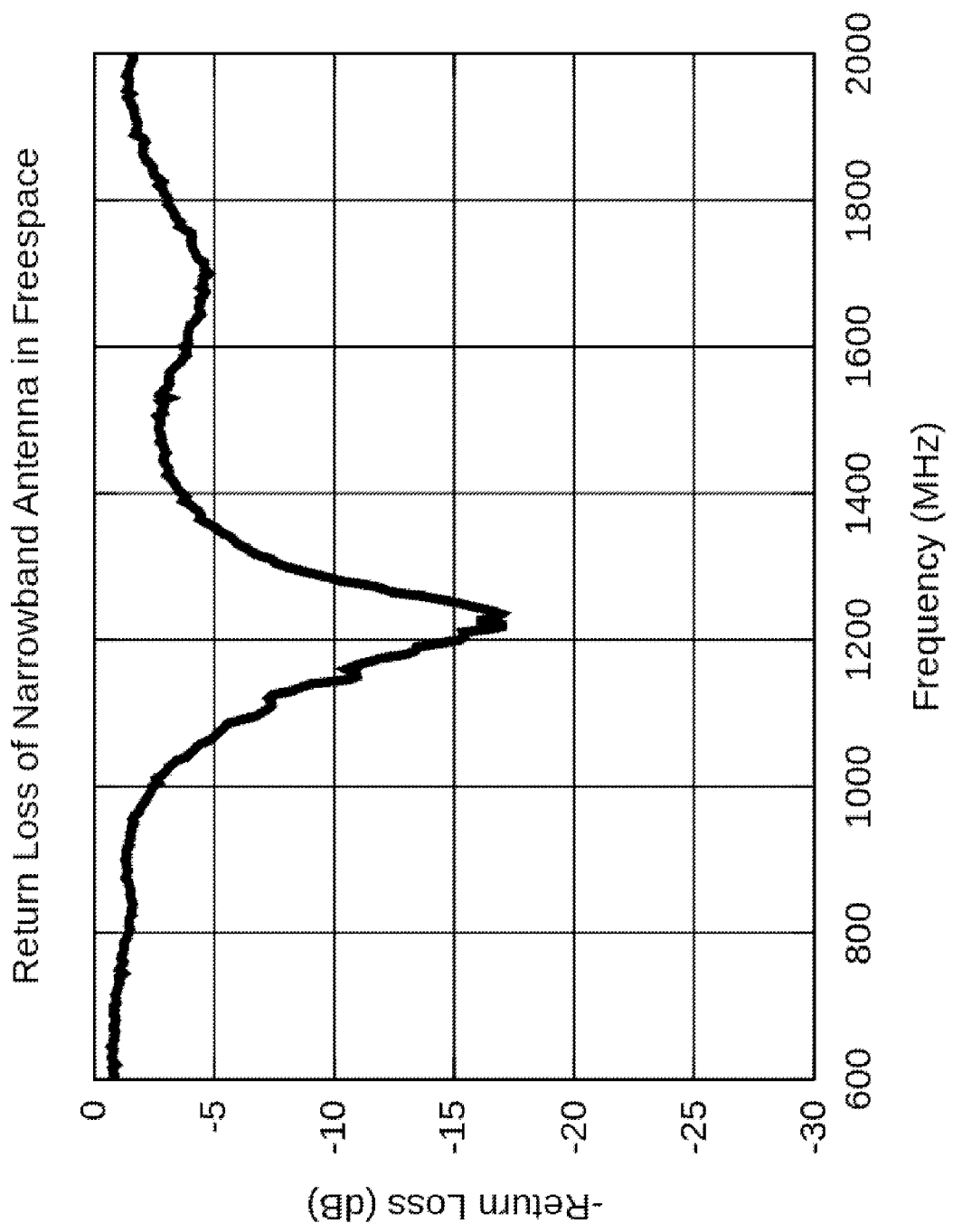
FIGS. 2a-2d illustrate the response of a narrowband dipole antenna to the presence of a conductive material, a dielectric material, or both (where the dielectric material is between the antenna and the conductive material). Return loss (S11) is the parameter measured for detecting conductive material. These figures illustrate why a single frequency system with a narrowband antenna will false detect in the presence of a detuning dielectric material and they reveal how a dipole antenna changes its resonant frequency in the presence of a dielectric material. In other words, the detuning effect of the dielectric material prevents the narrowband dipole antenna from discriminating between conductive and dielectric materials.
Figure 2B:
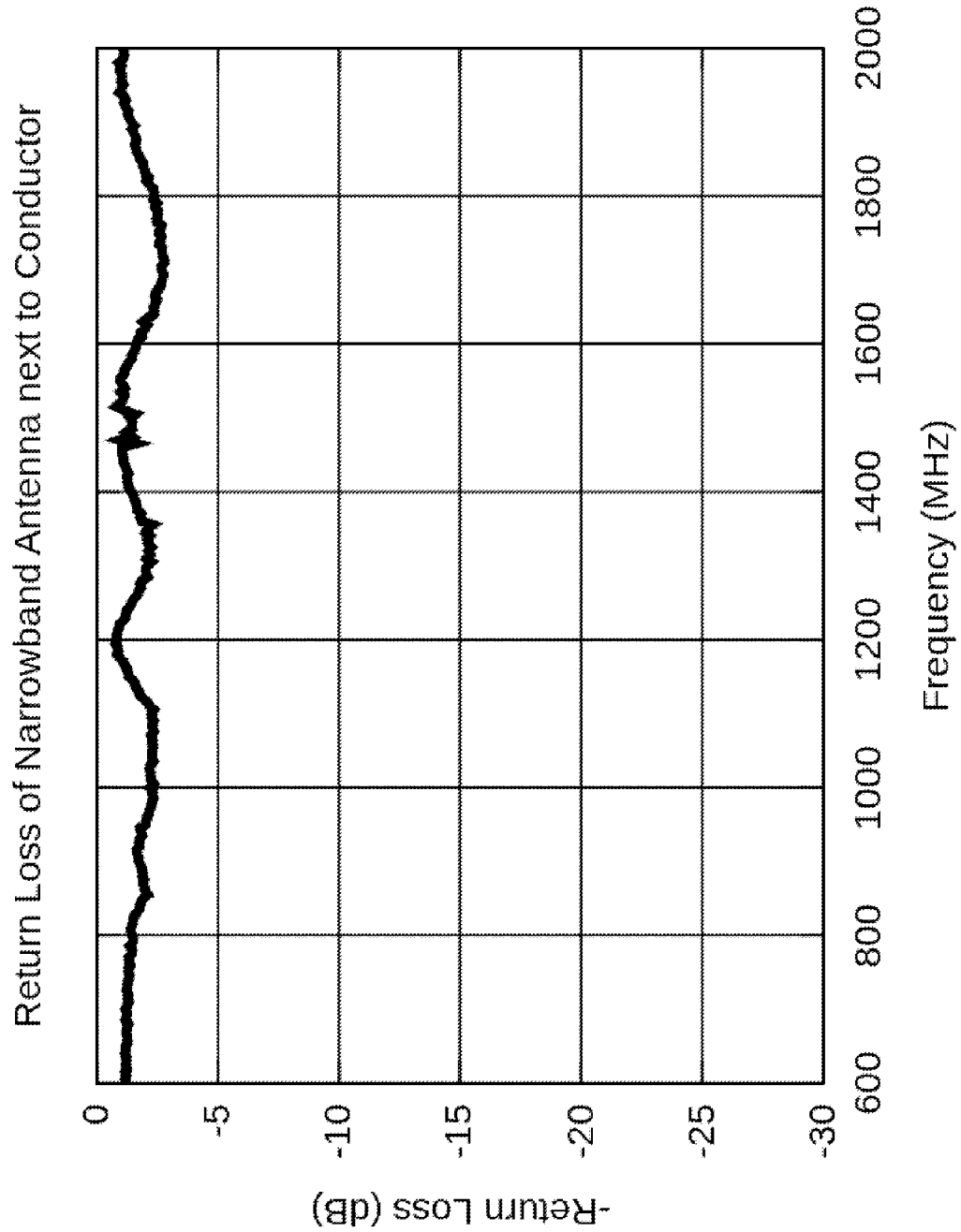
Figure 2C:
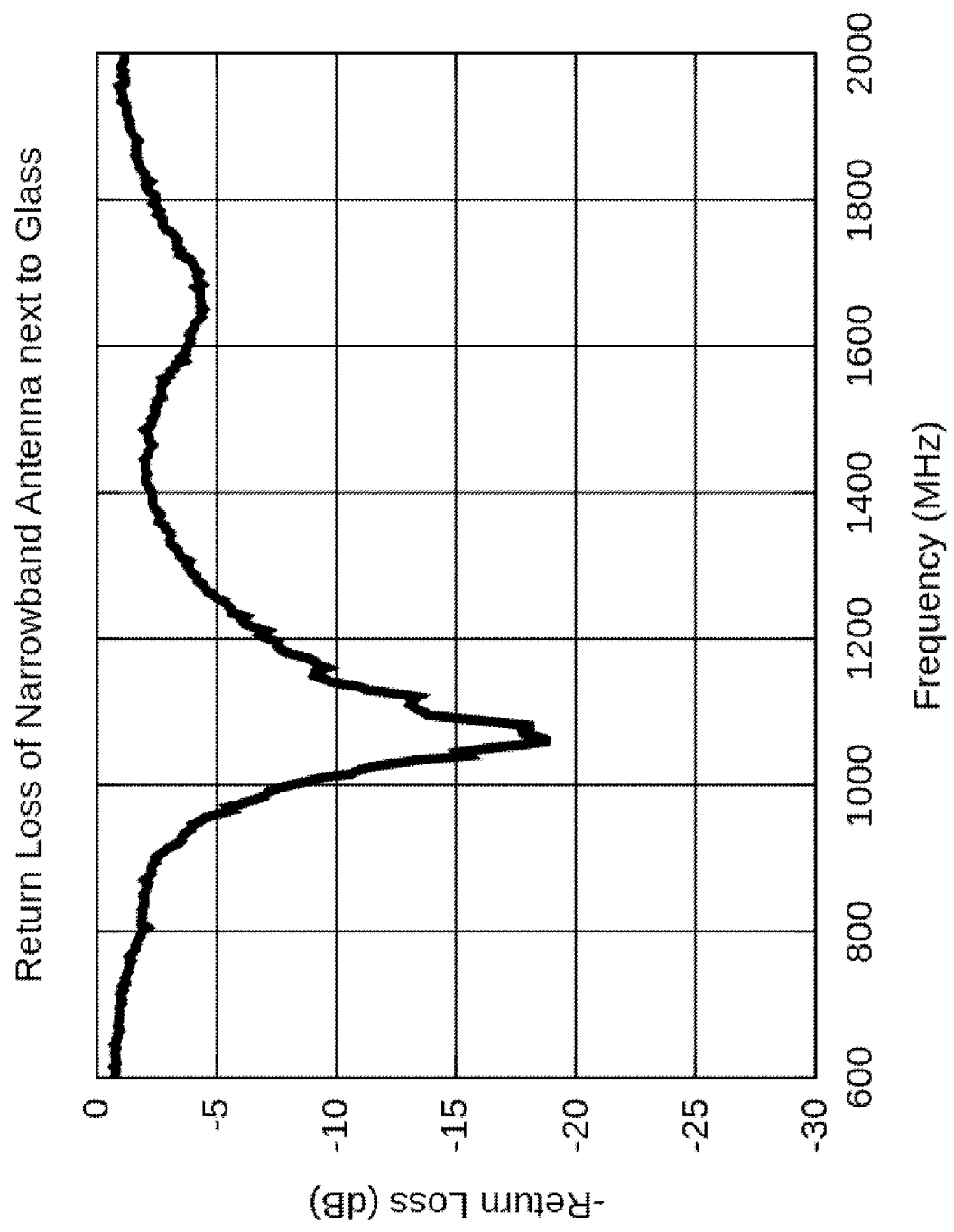
Figure 2D:
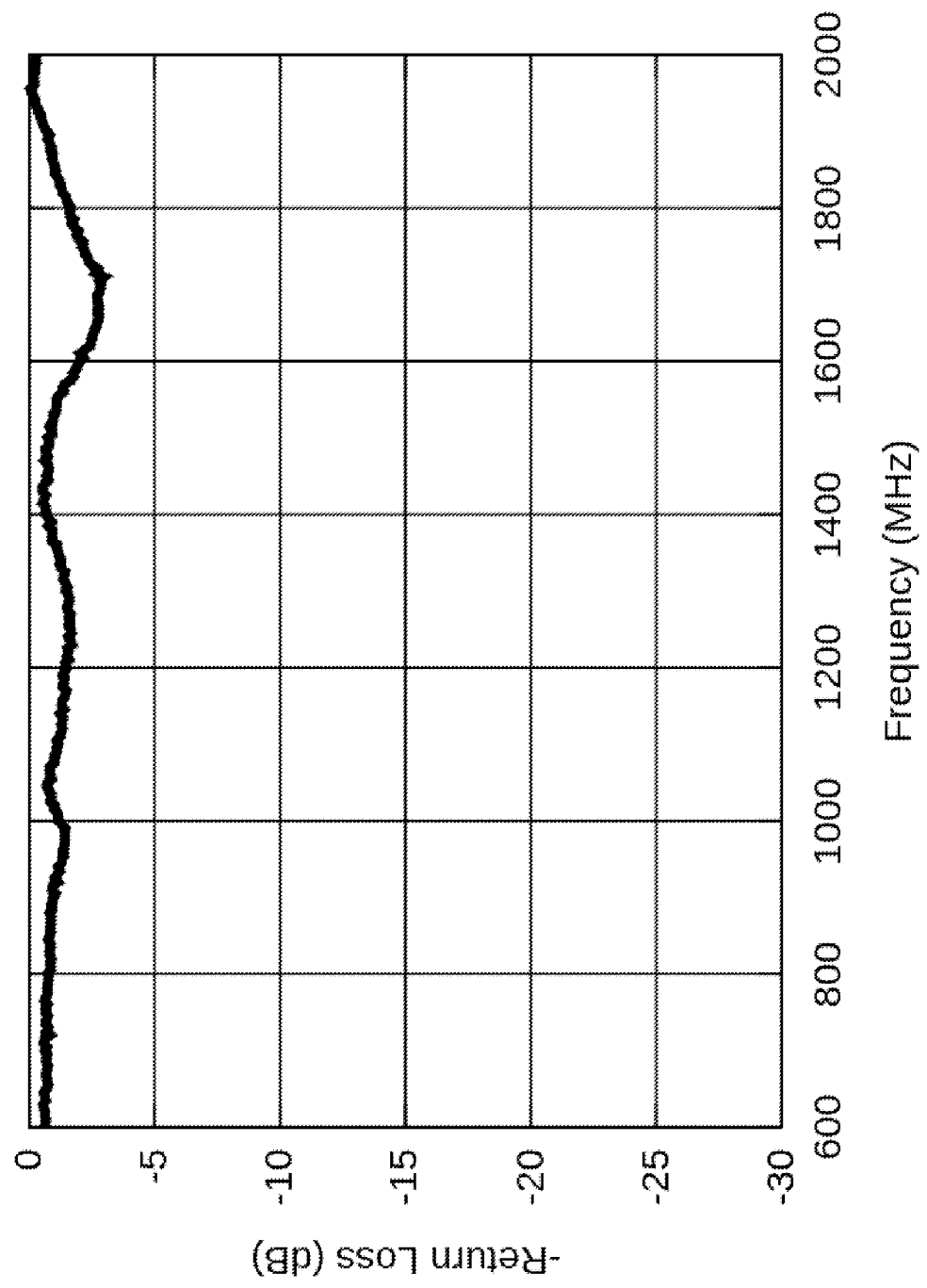
Figure 3A:
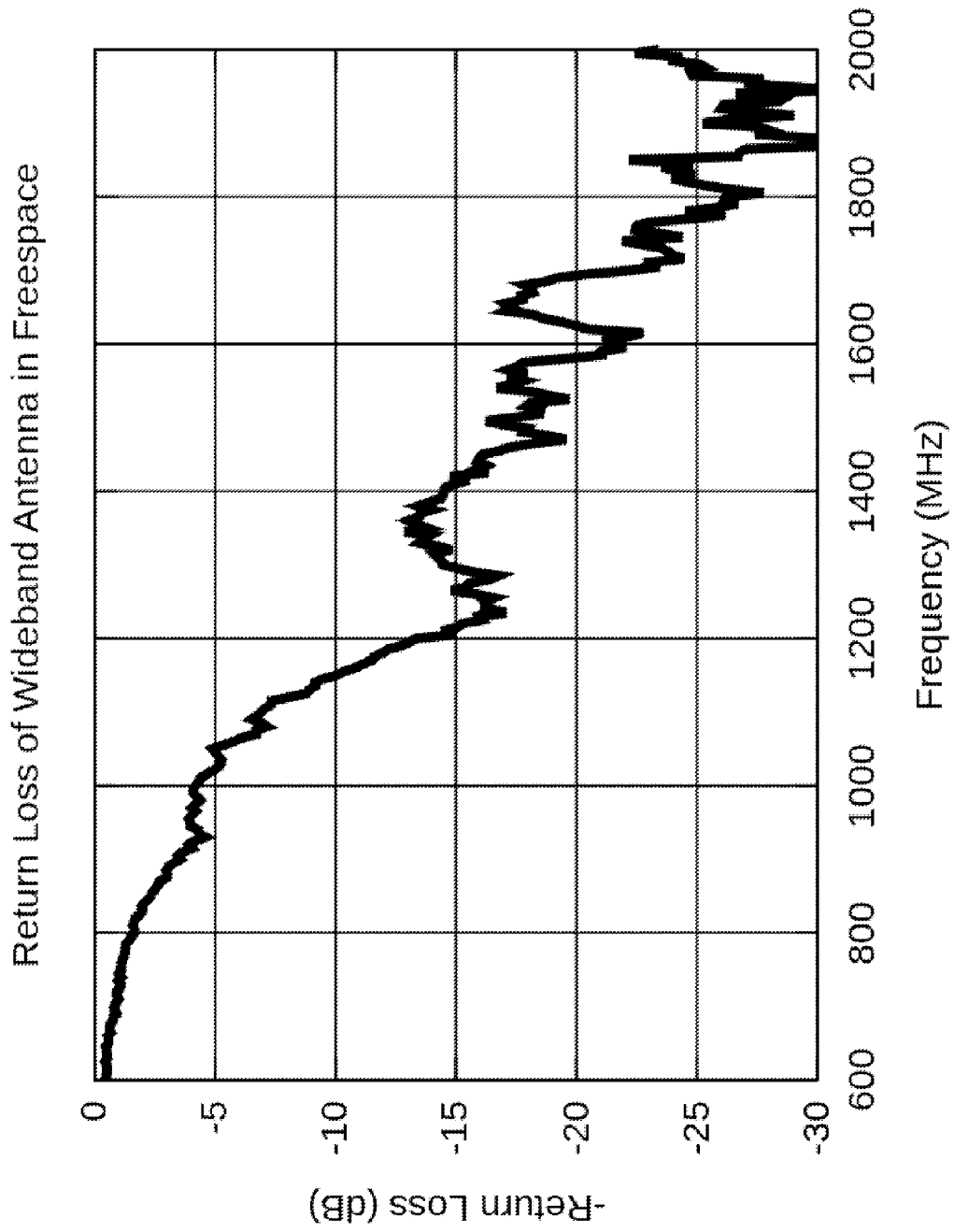
FIGS. 3a-3d illustrate the response of a wideband flared dipole antenna, in the presence of a conductive material and a dielectric material, and when a dielectric material is placed between the antenna and a conductive material. These figures illustrate how a dielectric material affects the frequency of the wideband antenna (the same as the narrowband dipole antenna), but, because it has much more bandwidth, the antenna continues to operate and will not false detect in the presence of a detuning dielectric material. In other words, the figures illustrate how a wideband antenna will shift its frequency, but, because it has more bandwidth than the amount of shift, will not false detect in the presence of a detuning dielectric material.
Figure 3B:
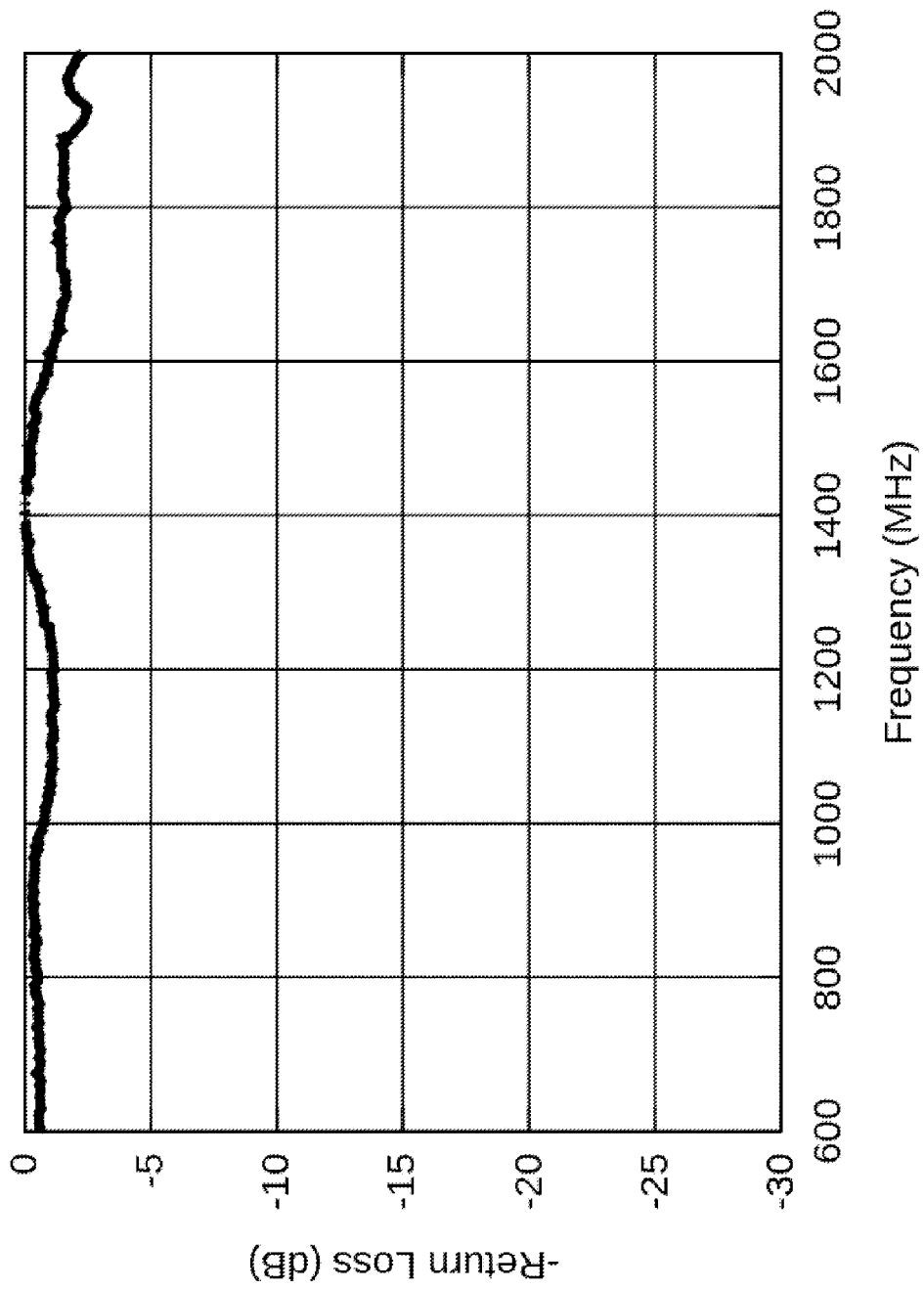
Figure 3C:
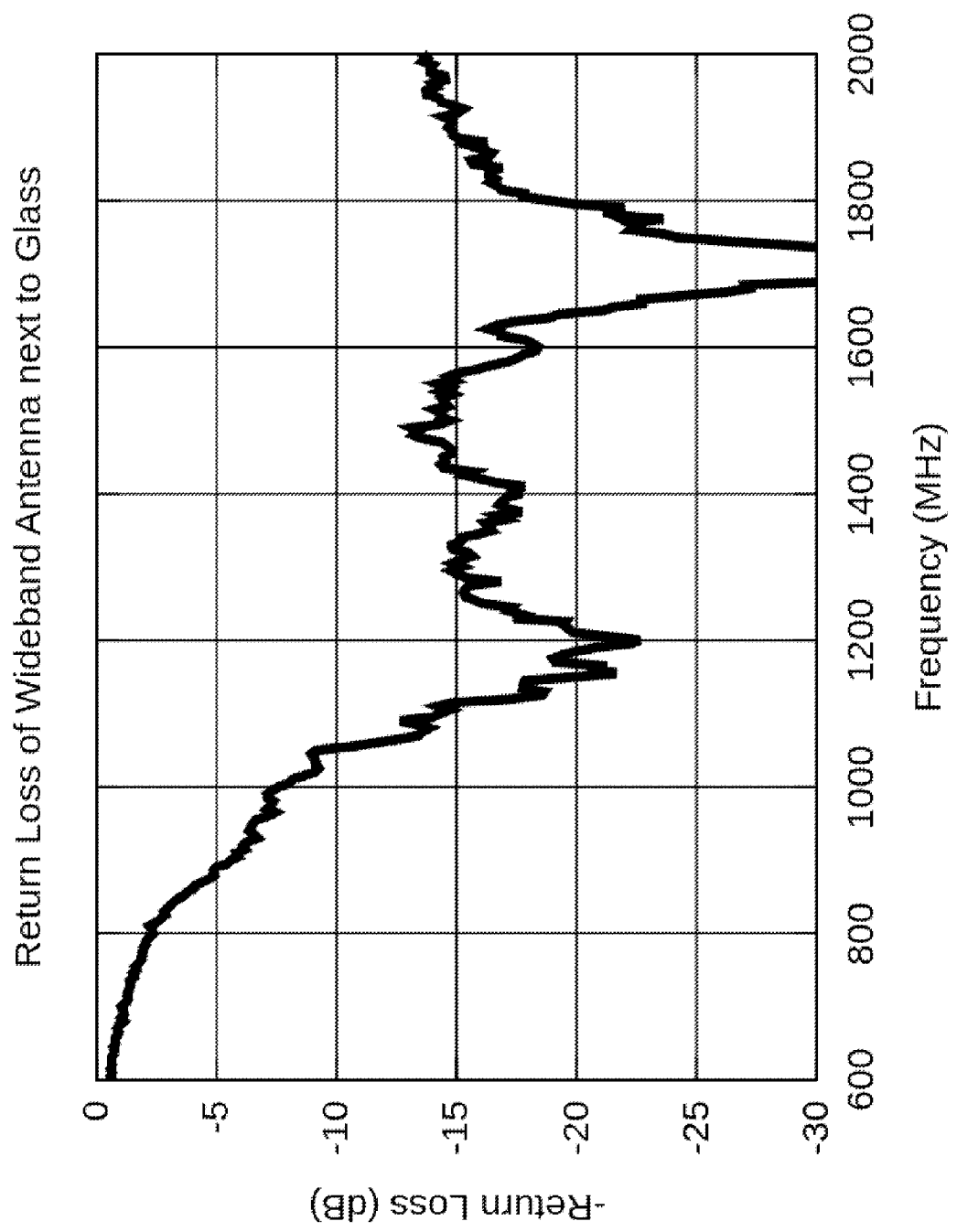
Figure 3D:
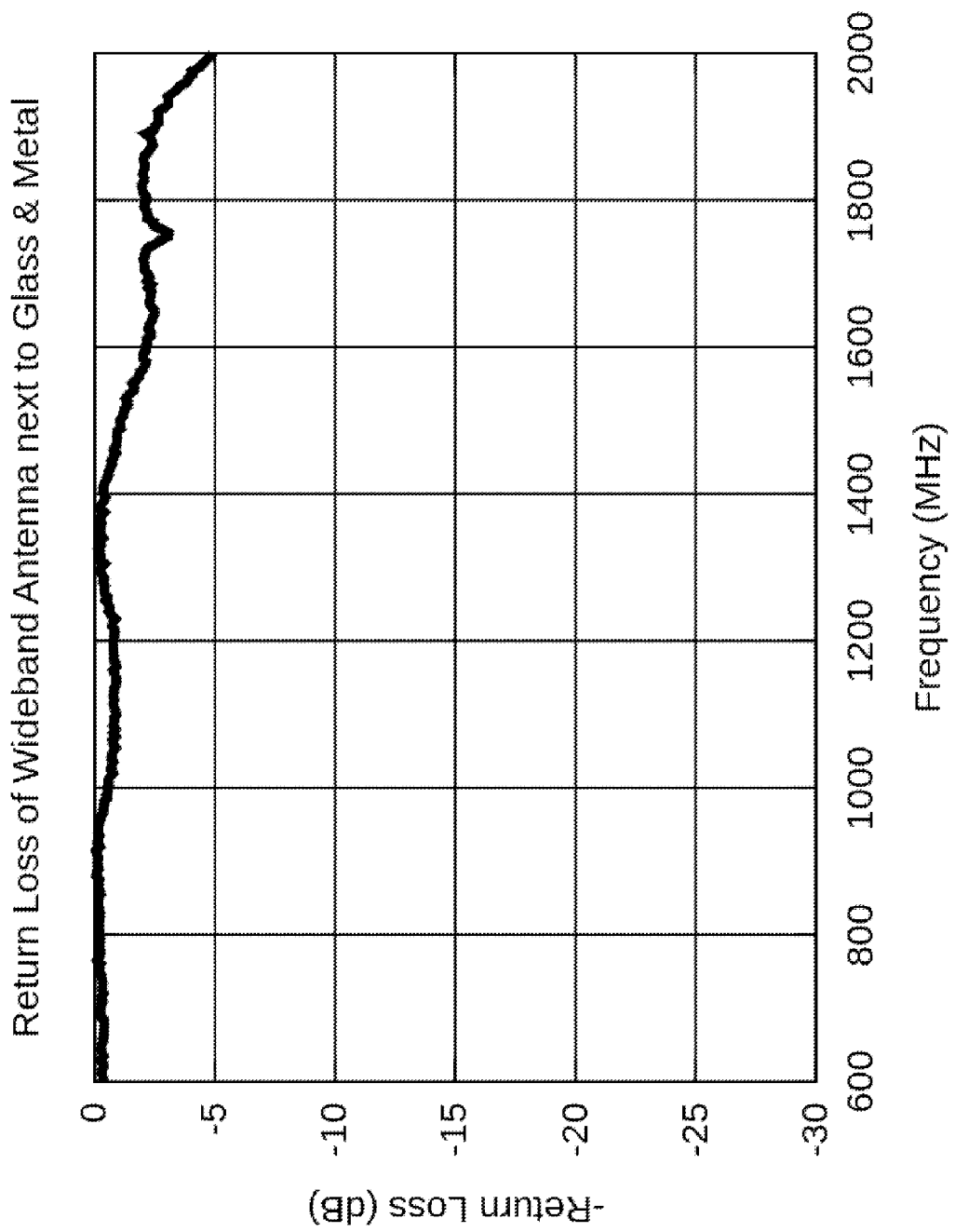
Figure 4A:
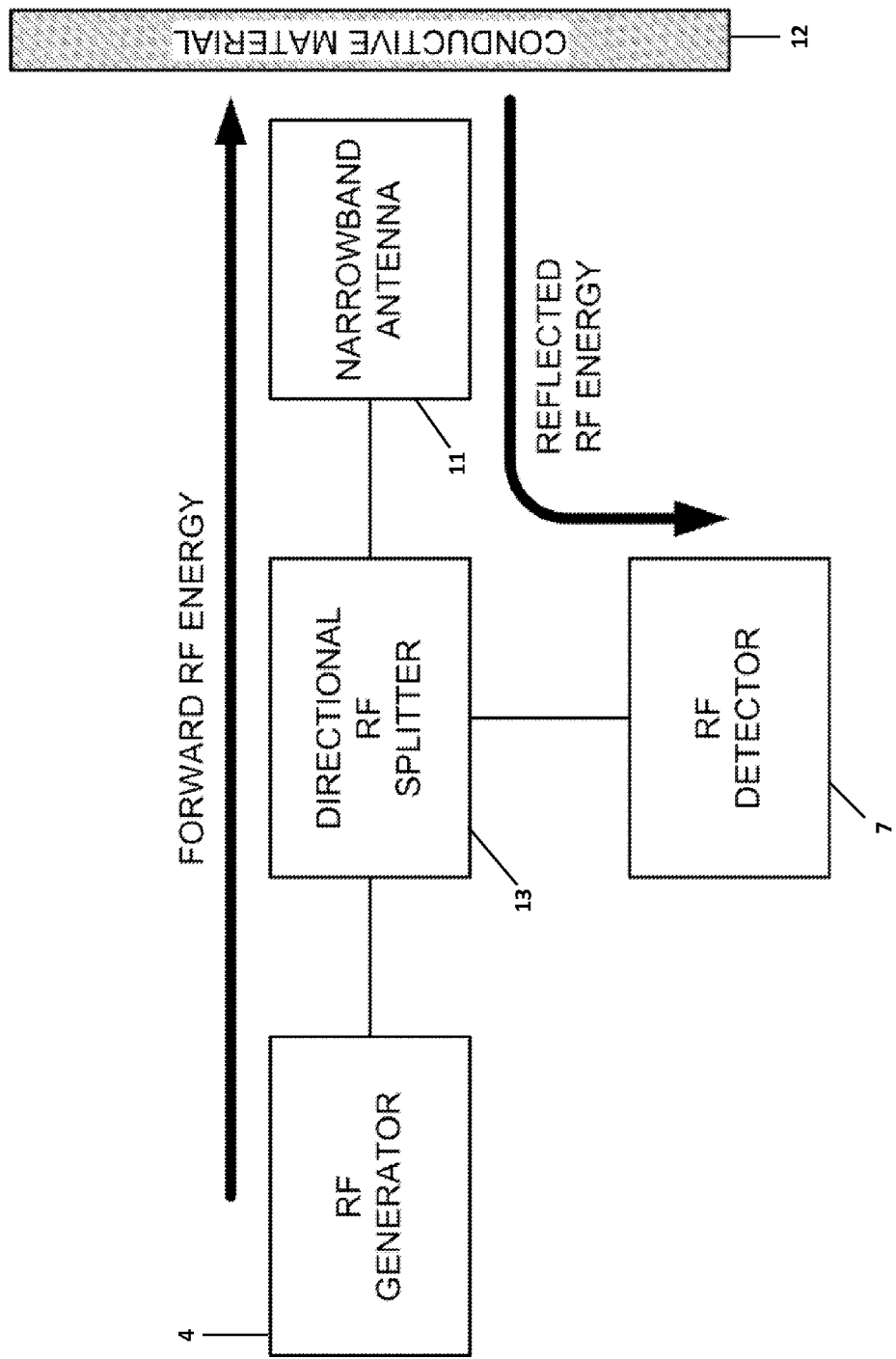
FIG. 4a illustrates maximum energy reflection when a conductive material (12) is next to a narrowband antenna (11). The conductive material (12) effectively shorts the narrowband antenna (11) causing a maximum return of the signal from the antenna (11). The RF generator (4) produces a sine wave having a frequency of about 1220 MHz. The energy flows through the directional RF splitter (13) and toward the narrowband antenna (11). The graph in FIG. 2b suggests that the conductive material causes most of the energy flowing toward the narrowband antenna (11) to reflect back toward the source causing low return loss value.
Figure 4B:
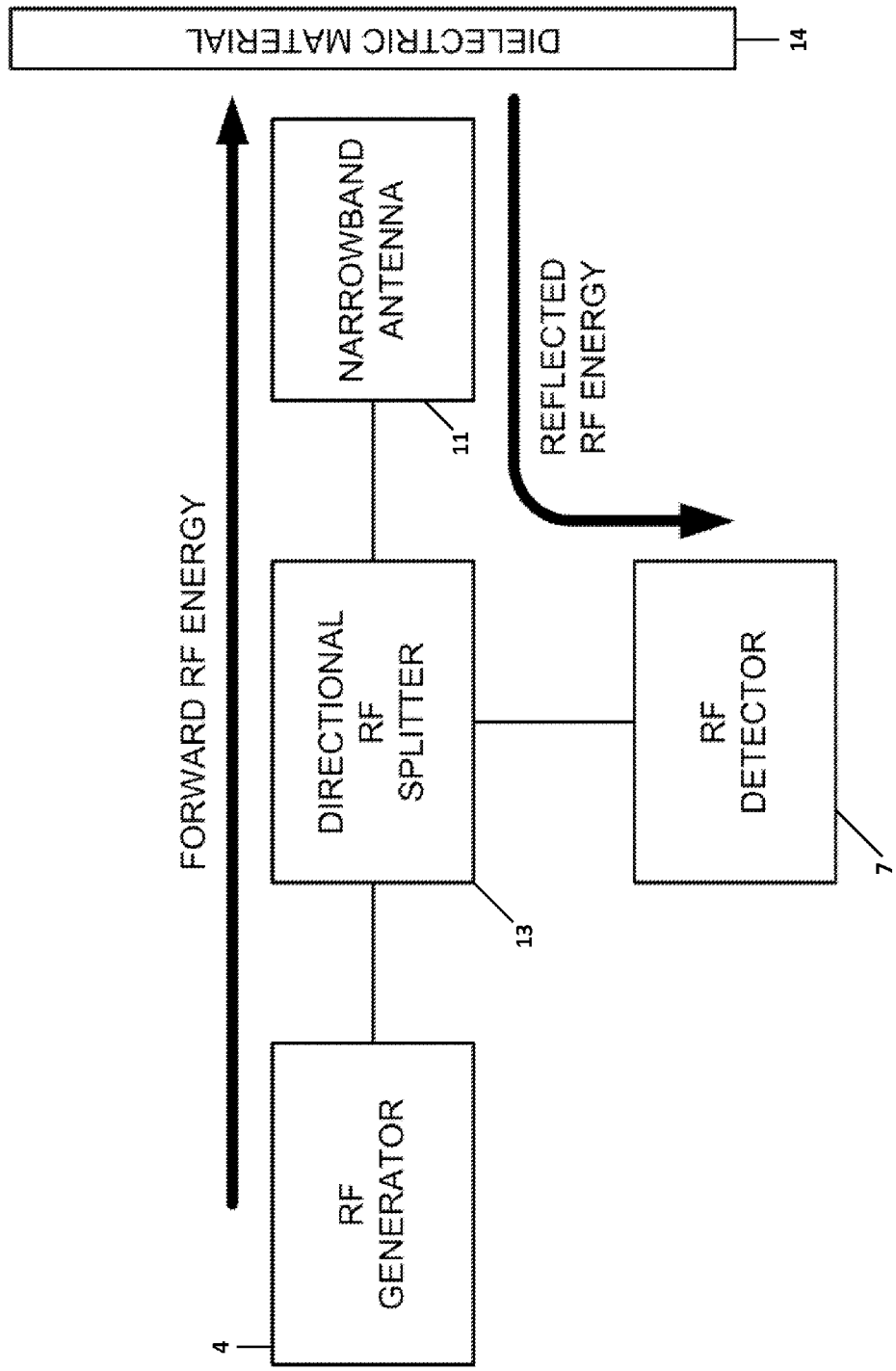
FIG. 4b illustrates maximum energy reflection, thus, minimum return loss, when a dielectric material (14), i.e., glass in this example, is next to a narrowband antenna (11). The dielectric material (14) moves the narrowband antenna's tuning point well below the original frequency, thereby causing the maximum return of the signal from the antenna (11). The graph in FIG. 2c suggests that the glass dielectric material moves the antenna's tuning point well below the original about 1220 MHz frequency, thereby causing a strong return of the RF signal from the antenna (11).
Figure 4C:
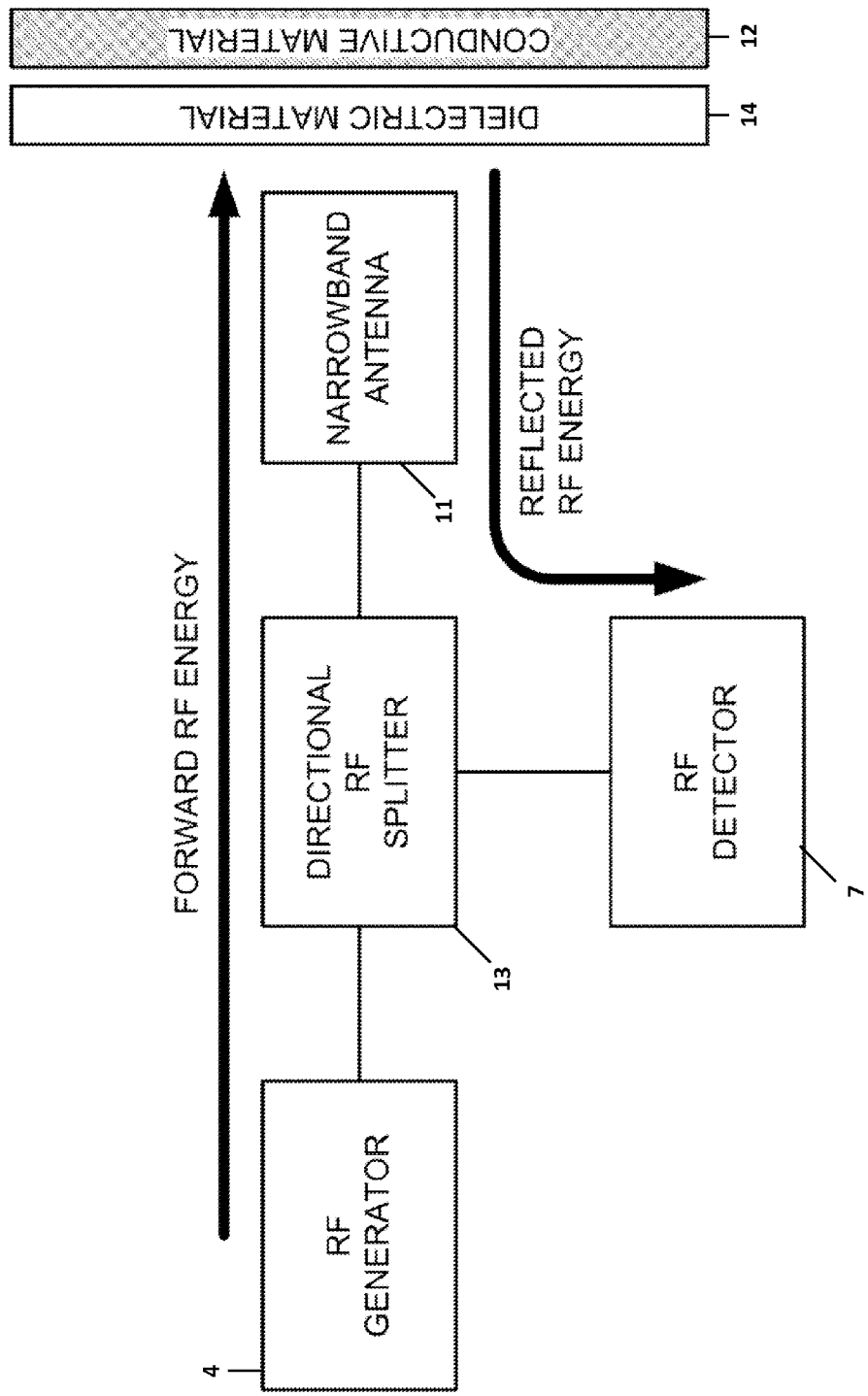
FIG. 4c illustrates maximum energy reflection when a dielectric material (14) is between a narrowband antenna (11) and a conductive surface (12). The conductor (12) dominates the response causing the maximum return of the signal from the narrowband antenna (11).
Figure 5A:
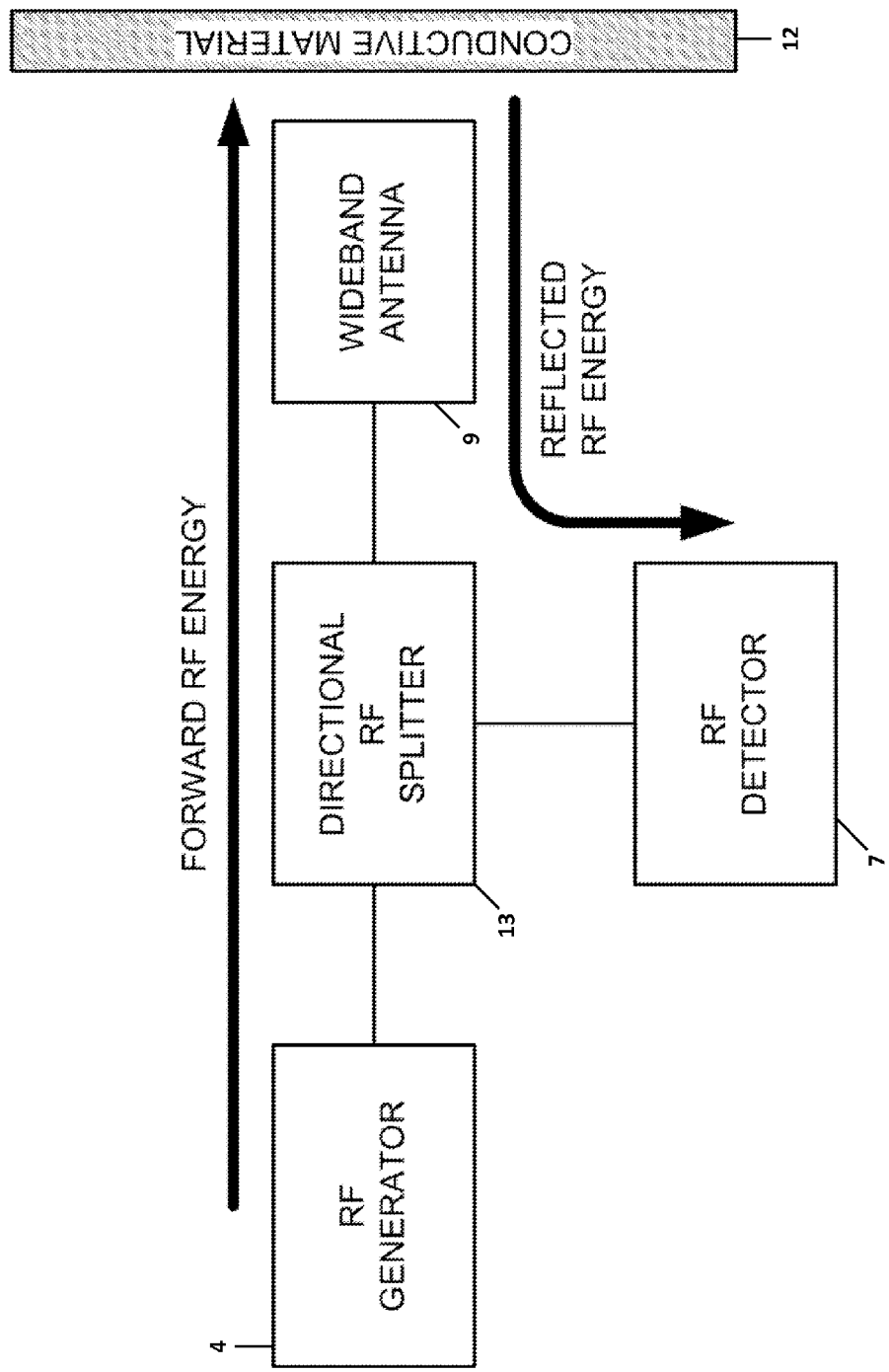
FIG. 5a illustrates maximum energy reflection when a conductive material (12) is next to a wideband antenna (9). The RF generator (4) produces a sine wave with a single frequency between about 1220 MHz and about 2000 MHz. The energy flows through the directional RF splitter (13) and toward the wideband antenna (9). The graph in FIG. 3b suggests that the conductive material (12) causes most of the energy flowing toward the wideband antenna (9) to reflect back toward the source causing low return loss value.
Figure 5B:
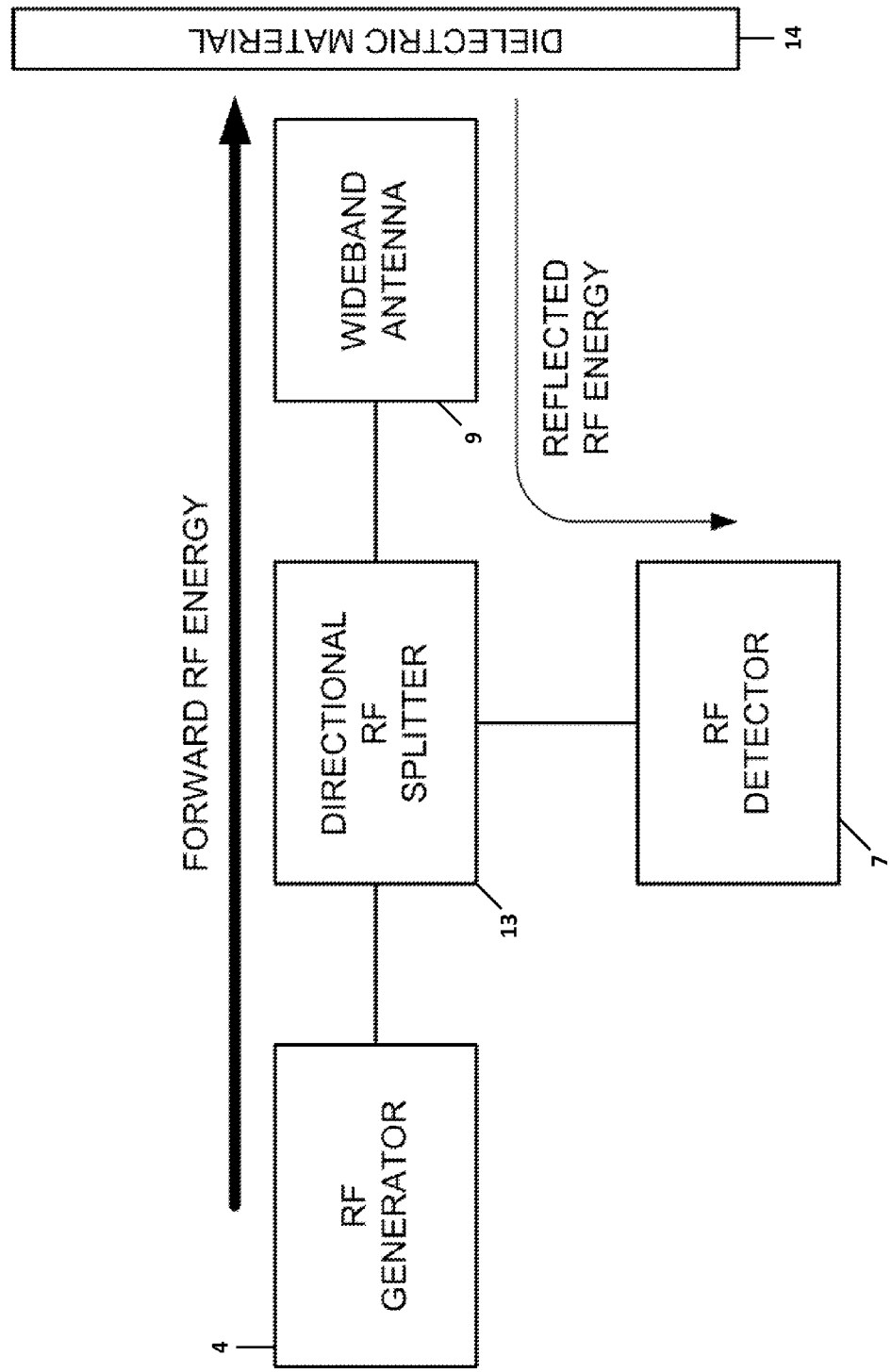
FIG. 5b illustrates minimum energy reflection, thus, maximum return loss, when a dielectric material (14) is next to a wideband antenna (9). The dielectric material moves the wideband antenna's tuning point below the original frequency, but, due to the wide bandwidth, the antenna (9) still transmits the energy, thereby causing minimal return of the signal from the antenna (9). The RF generator (4) produces a sine wave with a single frequency of between about 1220 MHz and about 2000 MHz. The energy flows through the directional RF splitter (13) and toward the wideband antenna (9). The graph in FIG. 3c suggests that the dielectric material (14) causes most of the energy flowing toward the antenna (9) to not reflect back toward the source yielding a high return loss value.
Figure 5C:
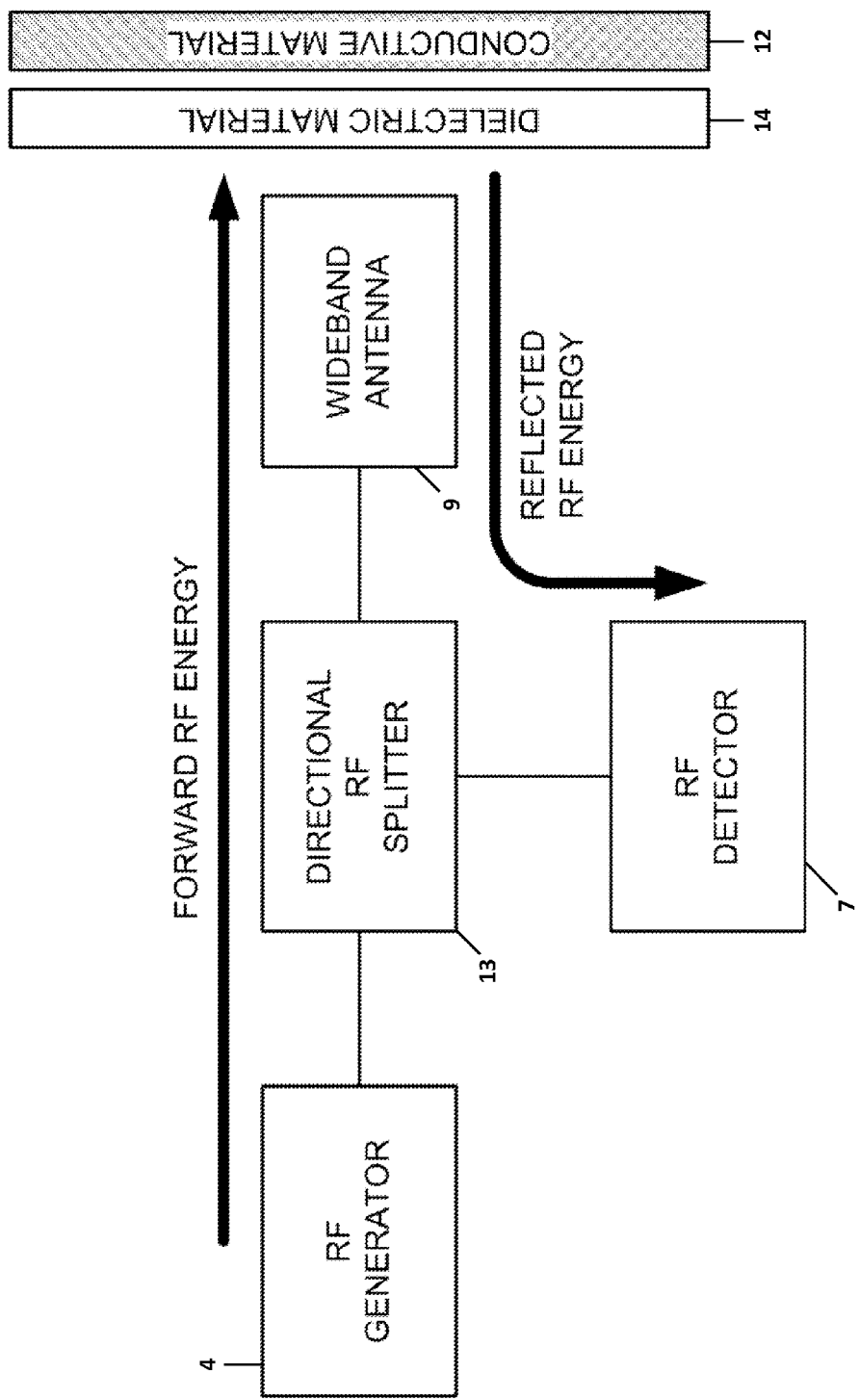
FIG. 5c illustrates maximum energy reflection when a dielectric material (14) is between a wideband antenna (9) and a conductive surface (12). The conductor (12) dominates the response causing the maximum return of the signal from the wideband antenna (9).

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

This specification discloses embodiments that incorporate features of the invention. The disclosed embodiments merely exemplify the invention. The scope of the invention is not limited to the disclosed embodiments. The invention is defined by the claims appended hereto.

The embodiments described, and references in the specification to "one embodiment," "an embodiment," "an example embodiment," "some embodiments," "example," etc., indicate that the embodiments described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the relevant art(s) to effectuate such feature, structure, or characteristic in connection with other embodiments whether or not explicitly described.

The invention provides methods of detecting and products used to detect the presence of a conductive thin film material on or in a material, such as an optically transparent material, such as a window, even in the vicinity of nearby metallic materials or nearby non-conductive materials, including non-conductive materials having dielectric properties. The inventive methods and products can be used to determine if a manufacturer of, for example, automotive, office building, retail, or residential, windows applied a conductive thin film treatment to its windows and, if so, where on the windows the thin film is located. Such information can be used to assess the quality of the windows and their ability to block ultraviolet rays, provide shatter resistance, and, when appropriately tinted, provide privacy. In addition, the inventive methods and products can be used to discern the viability of establishing a radio frequency path through a window before expending much effort on setting-up an antenna.

In a preferred embodiment, the invention is directed to conductive thin film detectors and methods of use. Preferably, the detector is relatively small and in the form of a hand-held device designed to detect the presence of conductive materials in close proximity to or with non-conductive materials. Examples of such non-conductive materials include, but are not limited to, glass, plastic, and porcelain, and other materials having dielectric properties. In addition, when the inventive detector is used, metallic objects nearby an object being tested do not generate false readings.

In another preferred embodiment, the inventive detector is small enough to hold in one hand and is battery-operated. Preferably, the battery is small enough for the detector to be hand-held, but strong enough to supply sufficient power to operate the detector for at least about one half hour before the battery needs to be replaced. The detector is preferably designed to minimize false detection rates, while, with precision, identify a thin film as metallic or non-metallic, even in the presence of materials with dielectric properties or of nearby materials with conductive properties.

Metallic thin film can be detected using a concept in antenna theory referred to as the "voltage standing wave ratio" (VSWR). The VSWR is an indicator of the amount of power sent to an antenna versus how much power reflects back to a transmitter. Return loss is another widely used way to express the same characteristics. The amount of power reflected is large when the antenna is not tuned to the frequency of the transmitter. If a wideband antenna is tuned to the frequency of a transmitter, the introduction of a dielectric, such as glass, near the antenna ("near-field") will have very little effect on the power reflected at the antenna. If a metallic, conductive surface is placed near the antenna, the antenna power reflection will significantly increase indicating the presence of metal. The effect of the metal on the antenna is significantly reduced upon separation of more than a couple of inches as illustrated in FIGS. 11a-11d.

Figure 7:
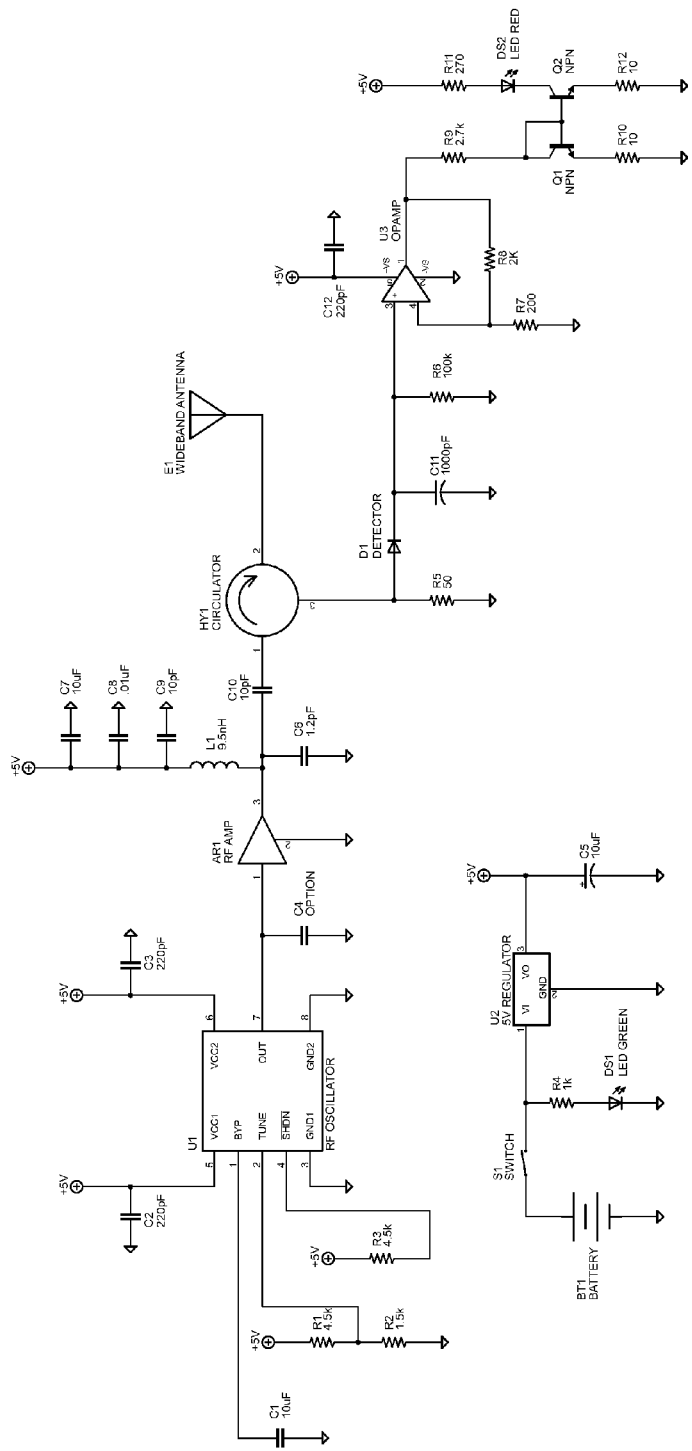
FIG. 7 illustrates a detailed schematic design of a working prototype of one embodiment of the inventive detector. More detail of this circuit embodiment is provided in the Detailed Description.
Figure 8:
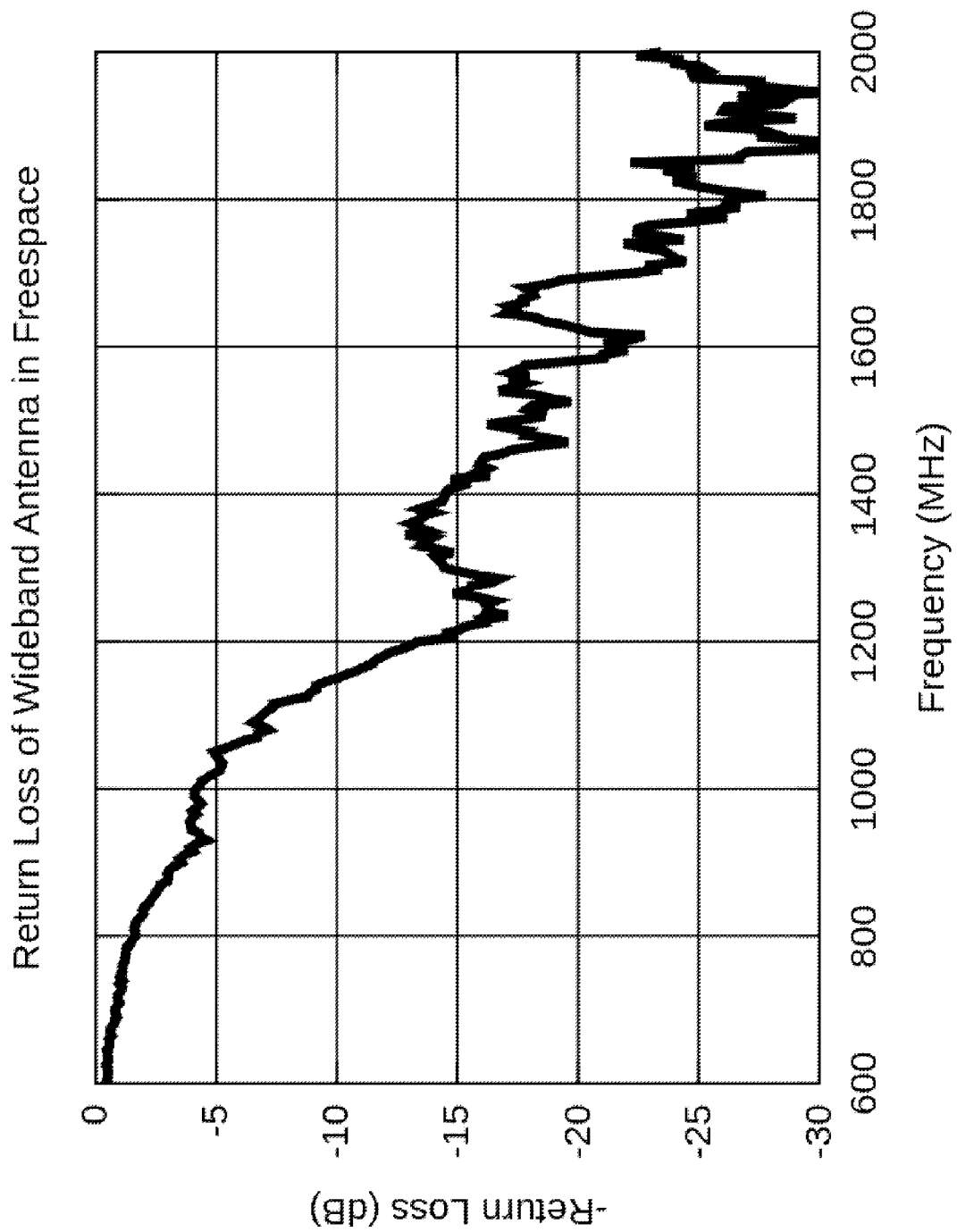
FIG. 8 illustrates a return loss response of a wideband antenna in freespace with no dielectric or conductive material near the antenna.
Figure 9A:
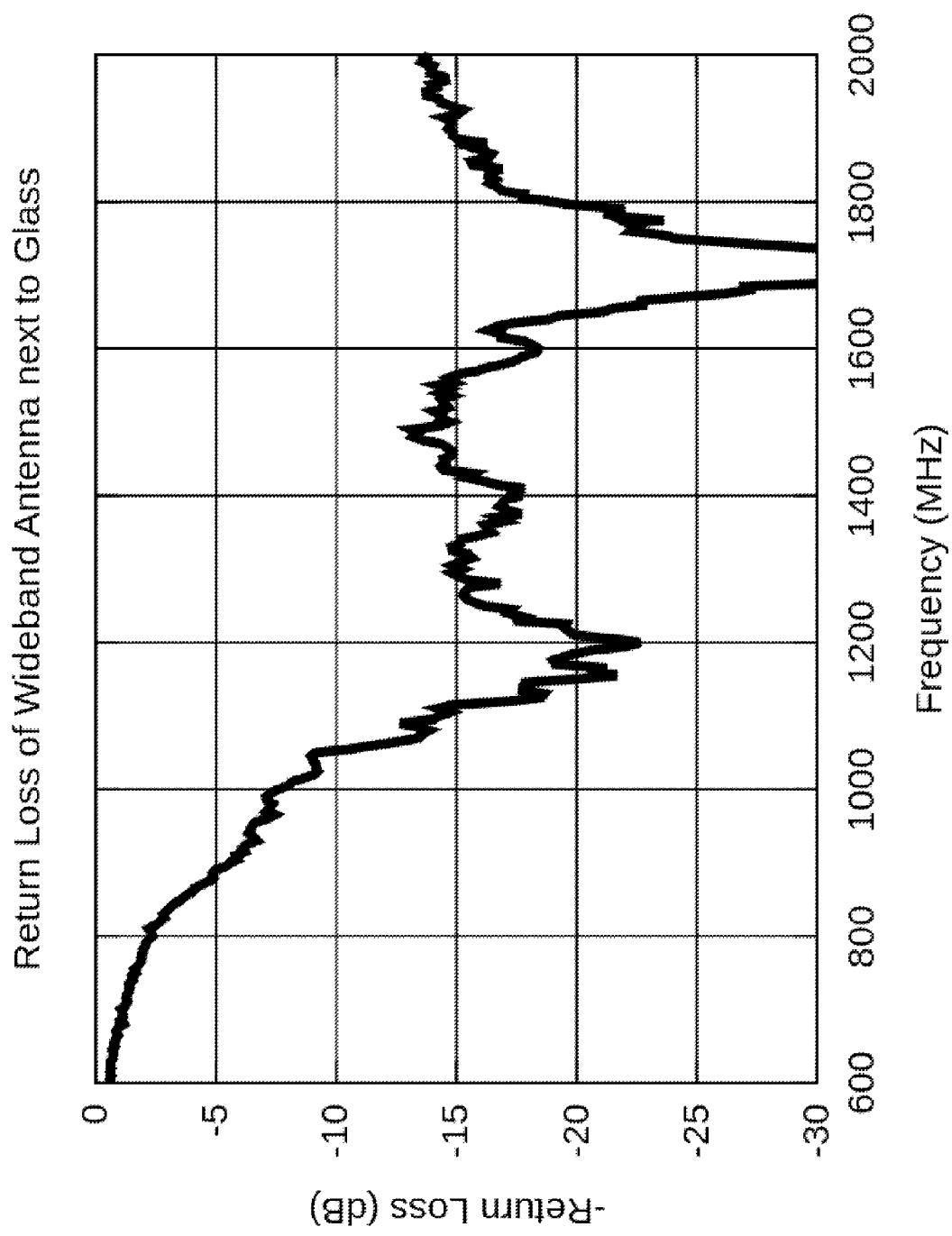
FIGS. 9a-9d illustrate the wideband antenna return loss plots of four non-conductive materials: window glass and three commercial product samples of non-conductive window coatings. The three window coating products have different amounts of opaqueness. These figures illustrate successful avoidance of false positive detection of a conductive material despite the detuning effects of dielectric materials at any single frequency between about 1220 MHz and about 2000 MHz.
Figure 9B:
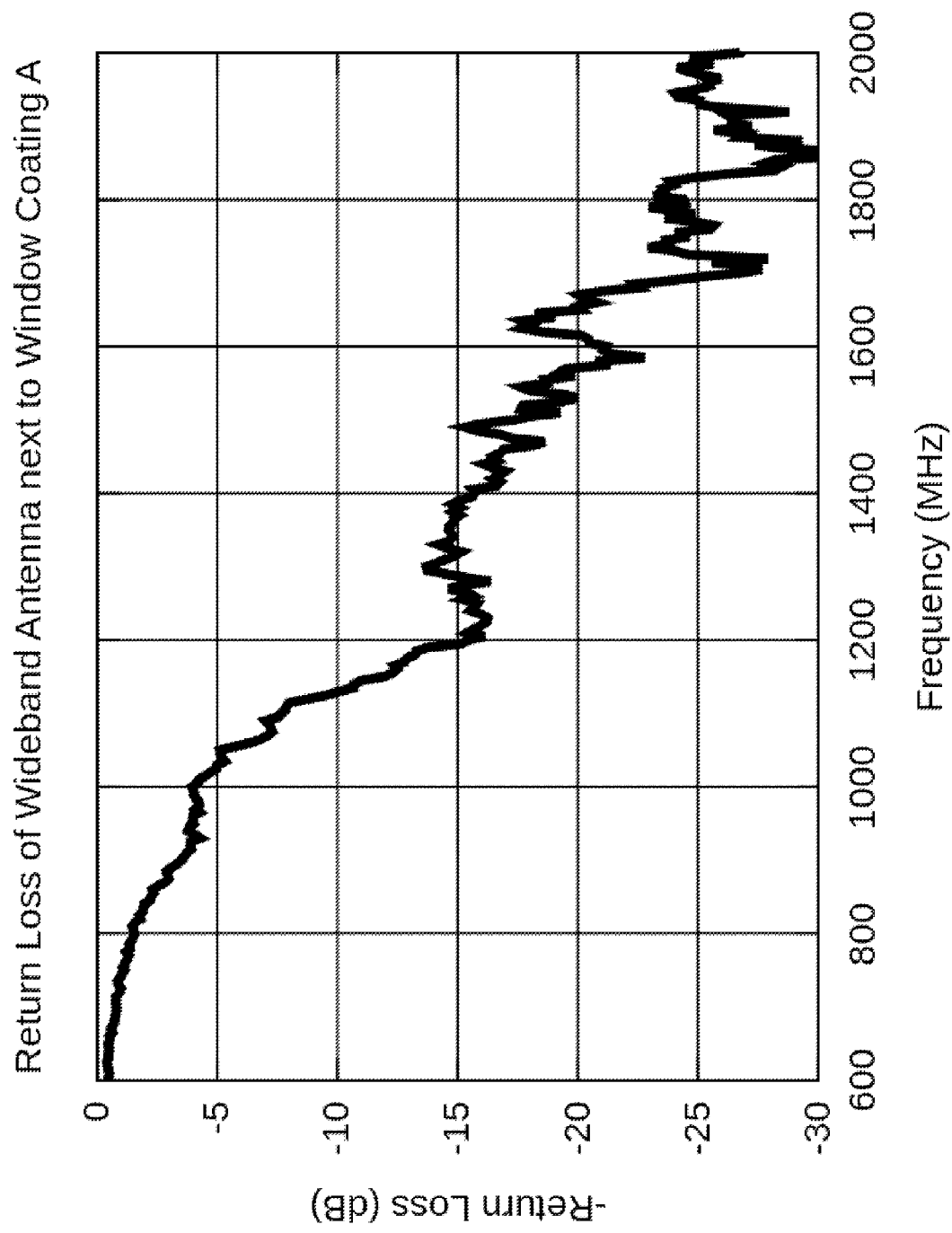
Figure 9C:
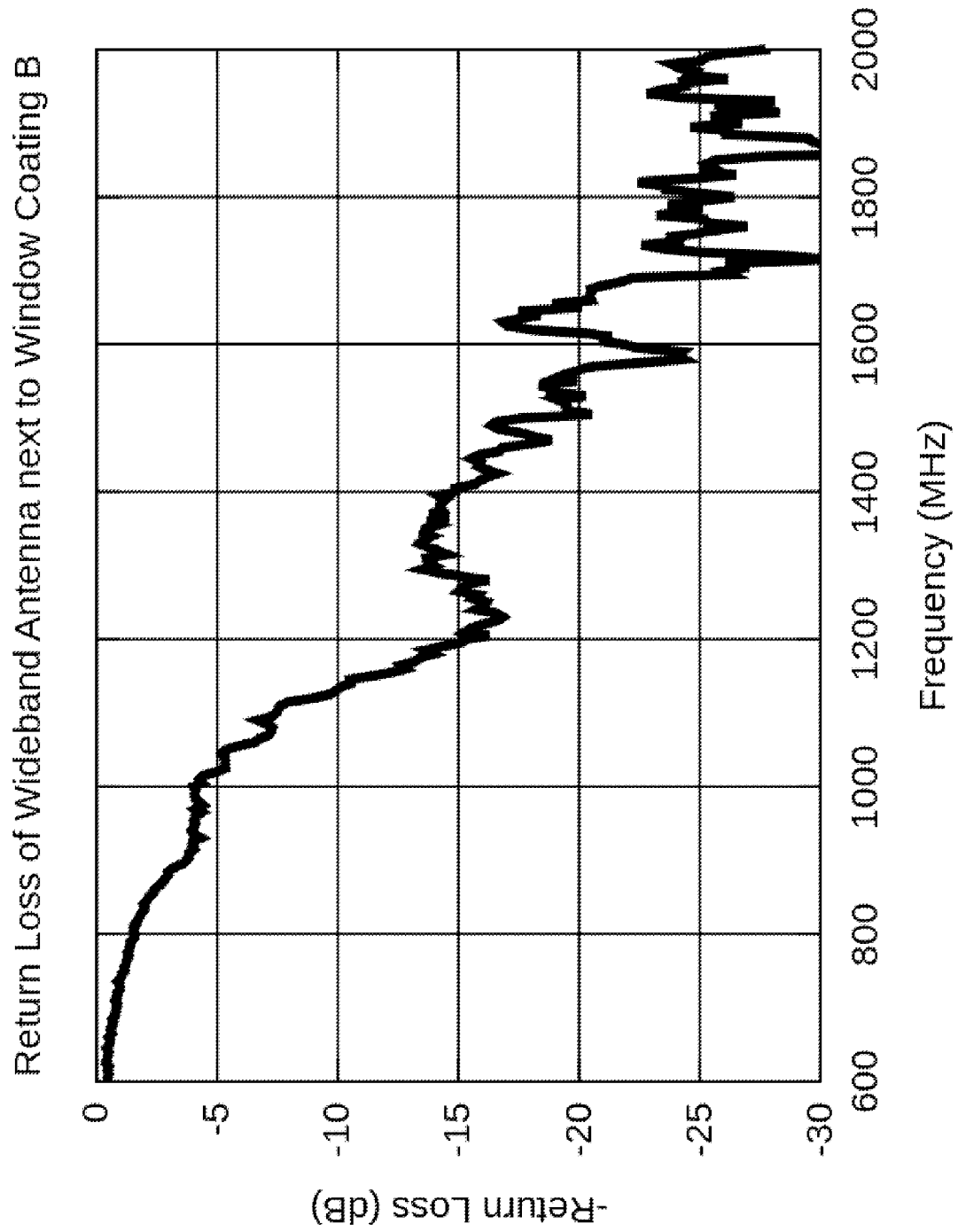
Figure 9D:
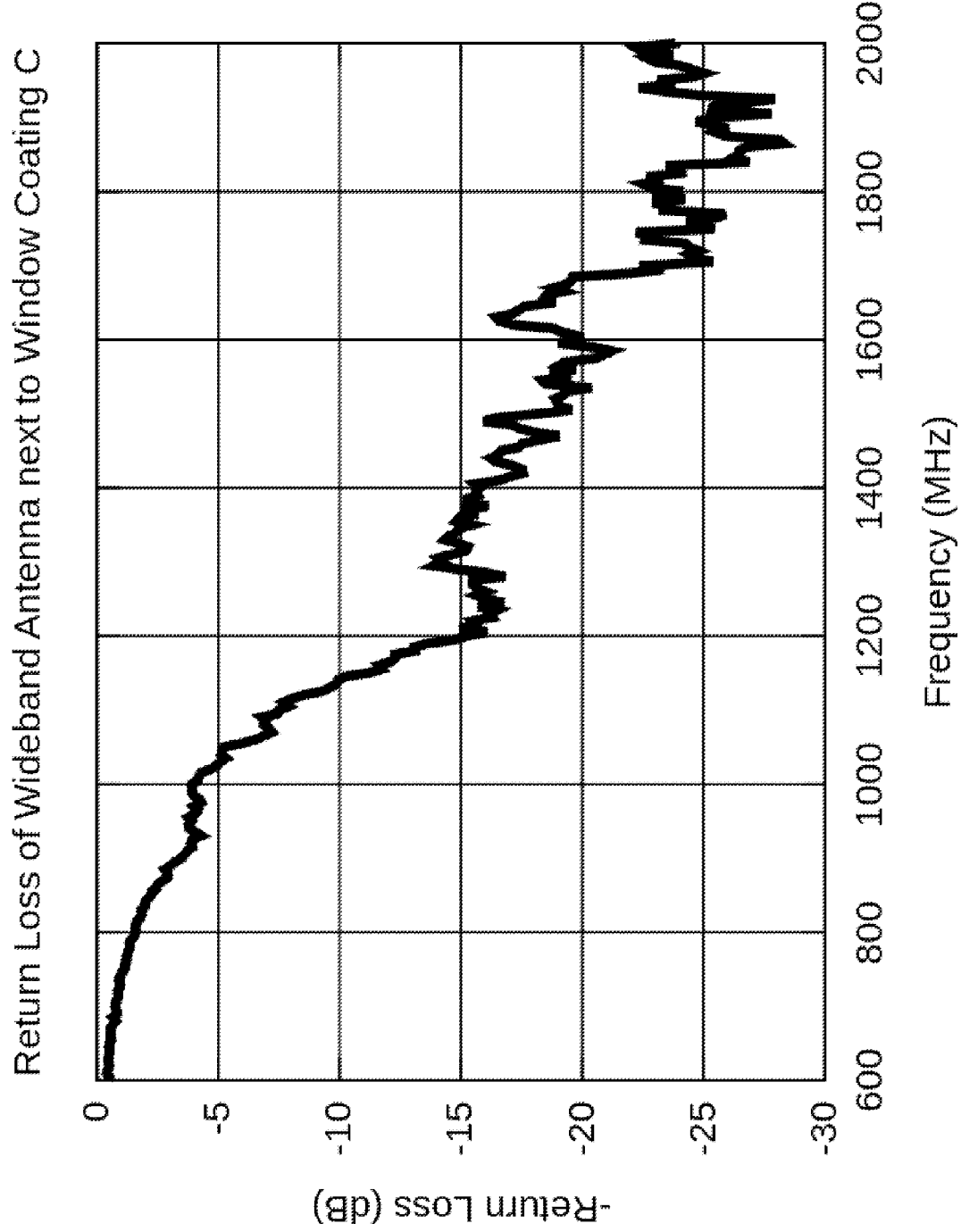
Figure 10A:
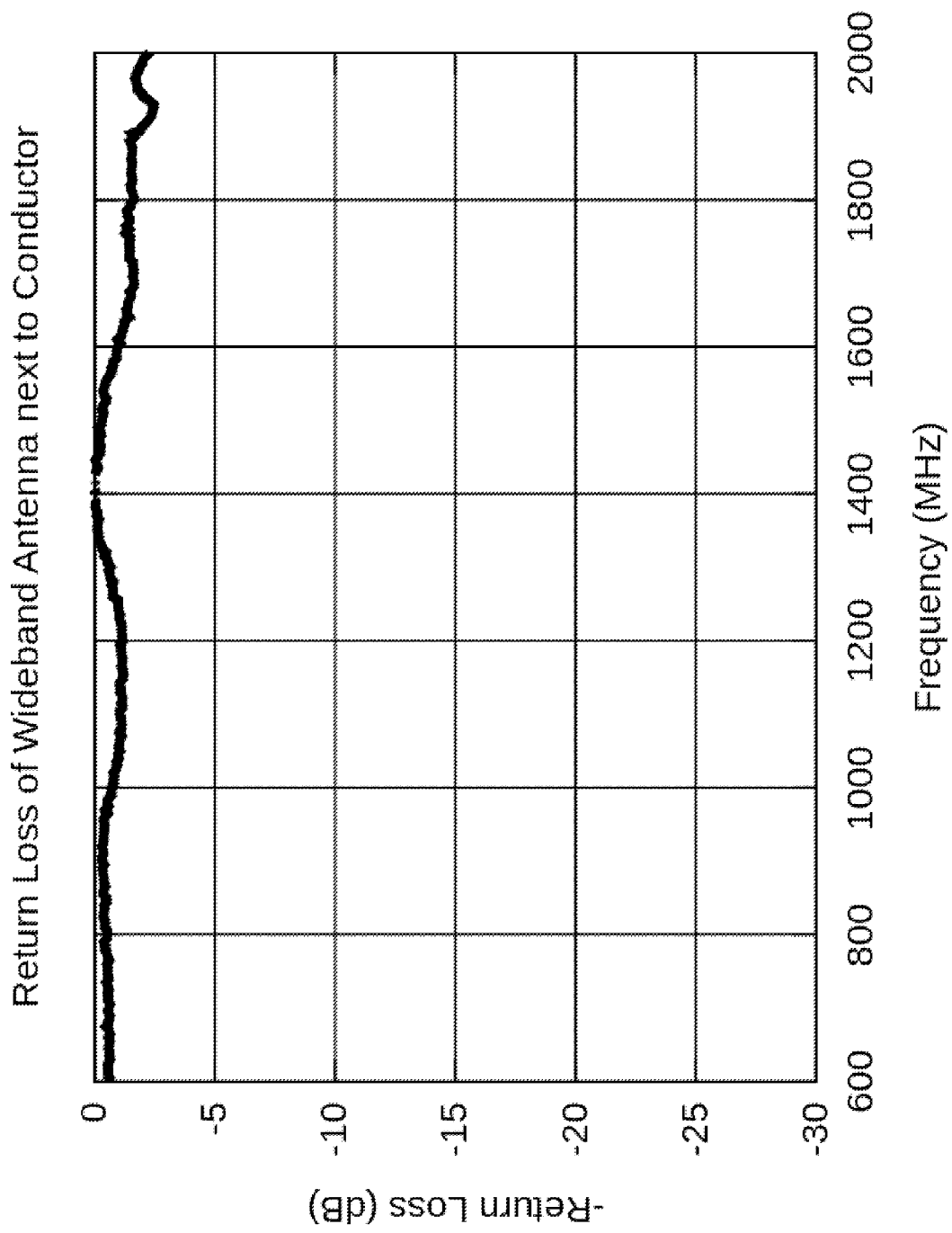
FIGS. 10a-10d illustrate the wideband antenna return loss plots of four conductive materials: metal plate and three commercial product samples of conductive window coatings. The three window coating products have different amounts of opaqueness. These figures illustrate successful detection of conductive materials at any single frequency between about 1220 MHz and about 2000 MHz.
Figure 10B:
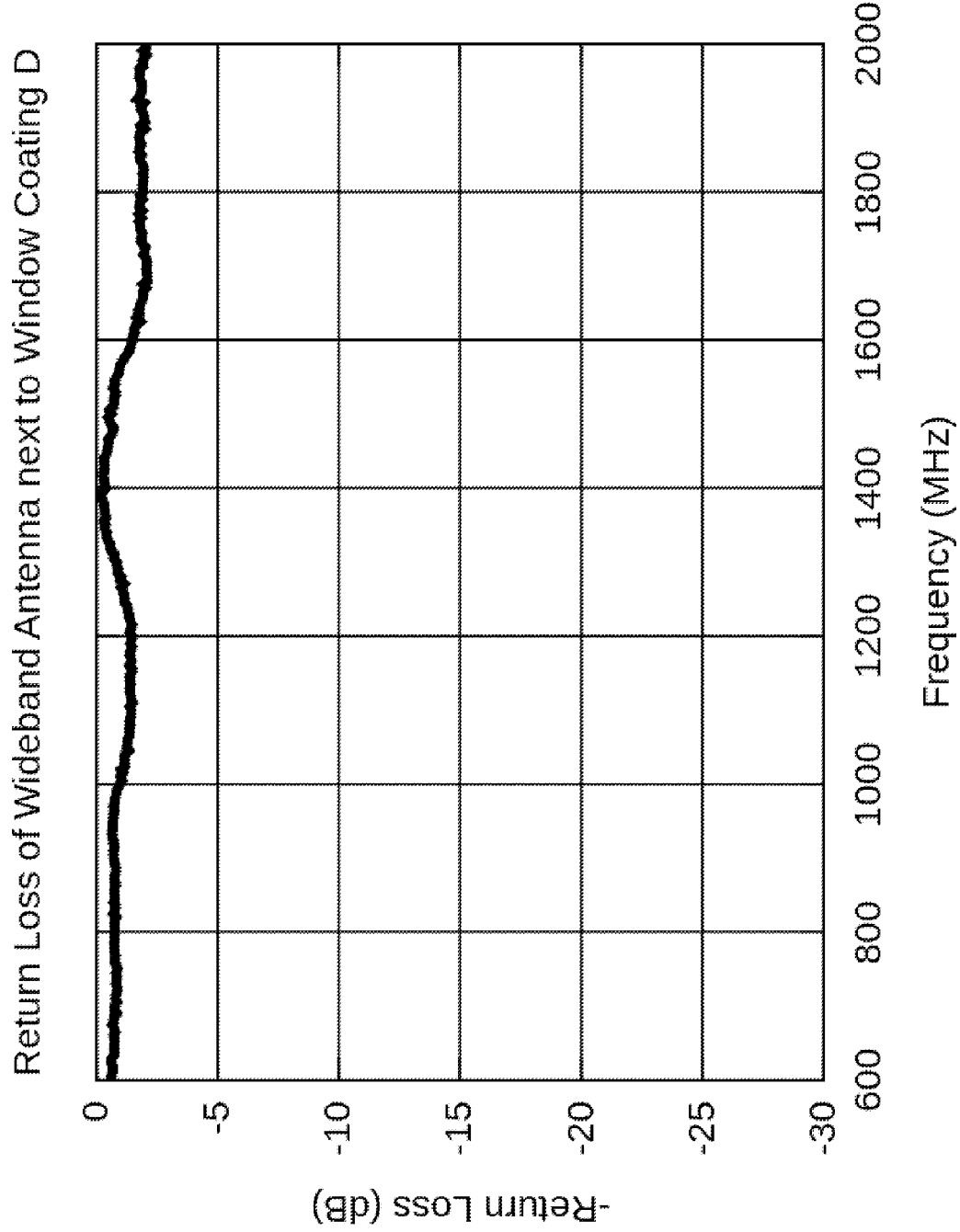
Figure 10C:
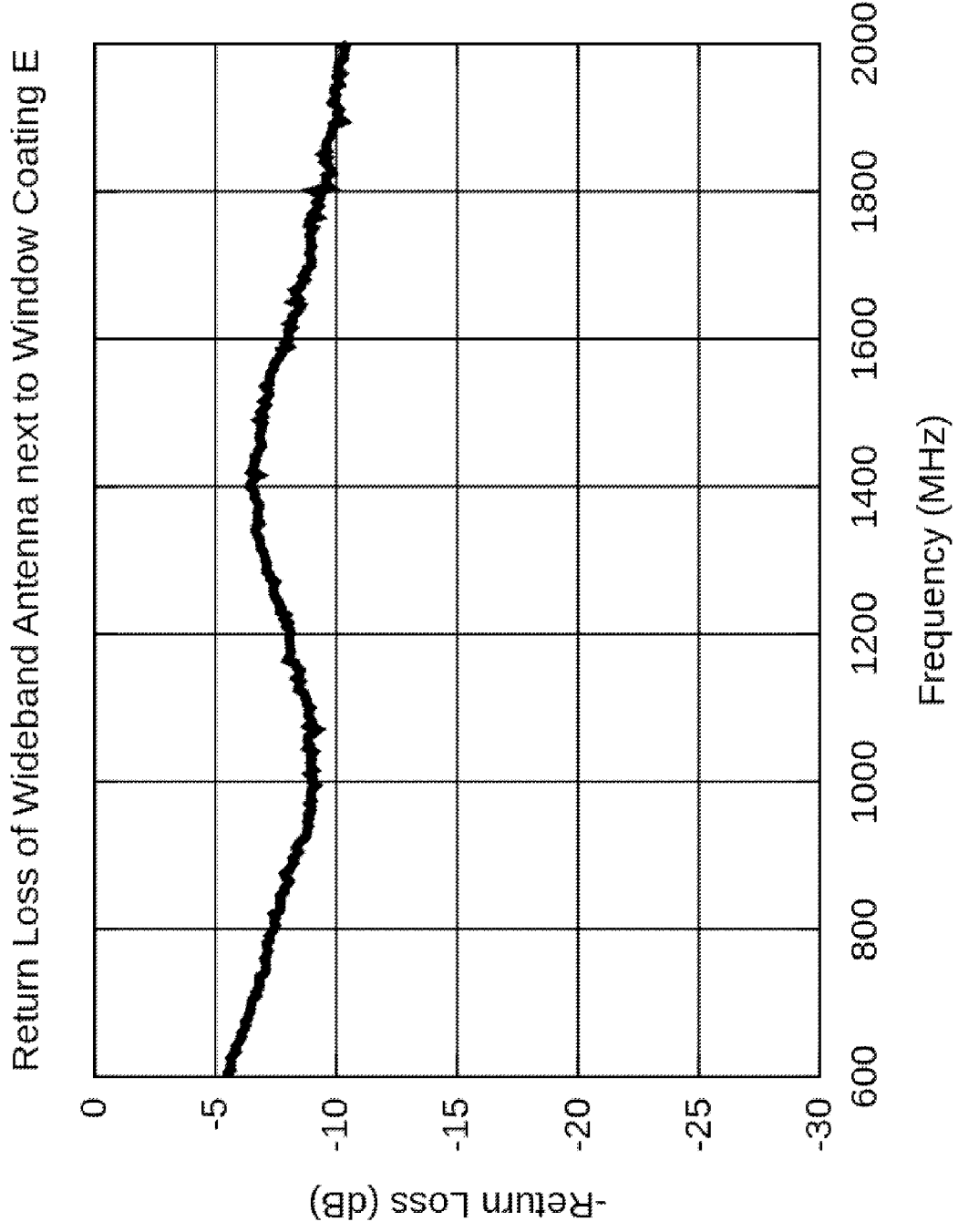
Figure 10D:
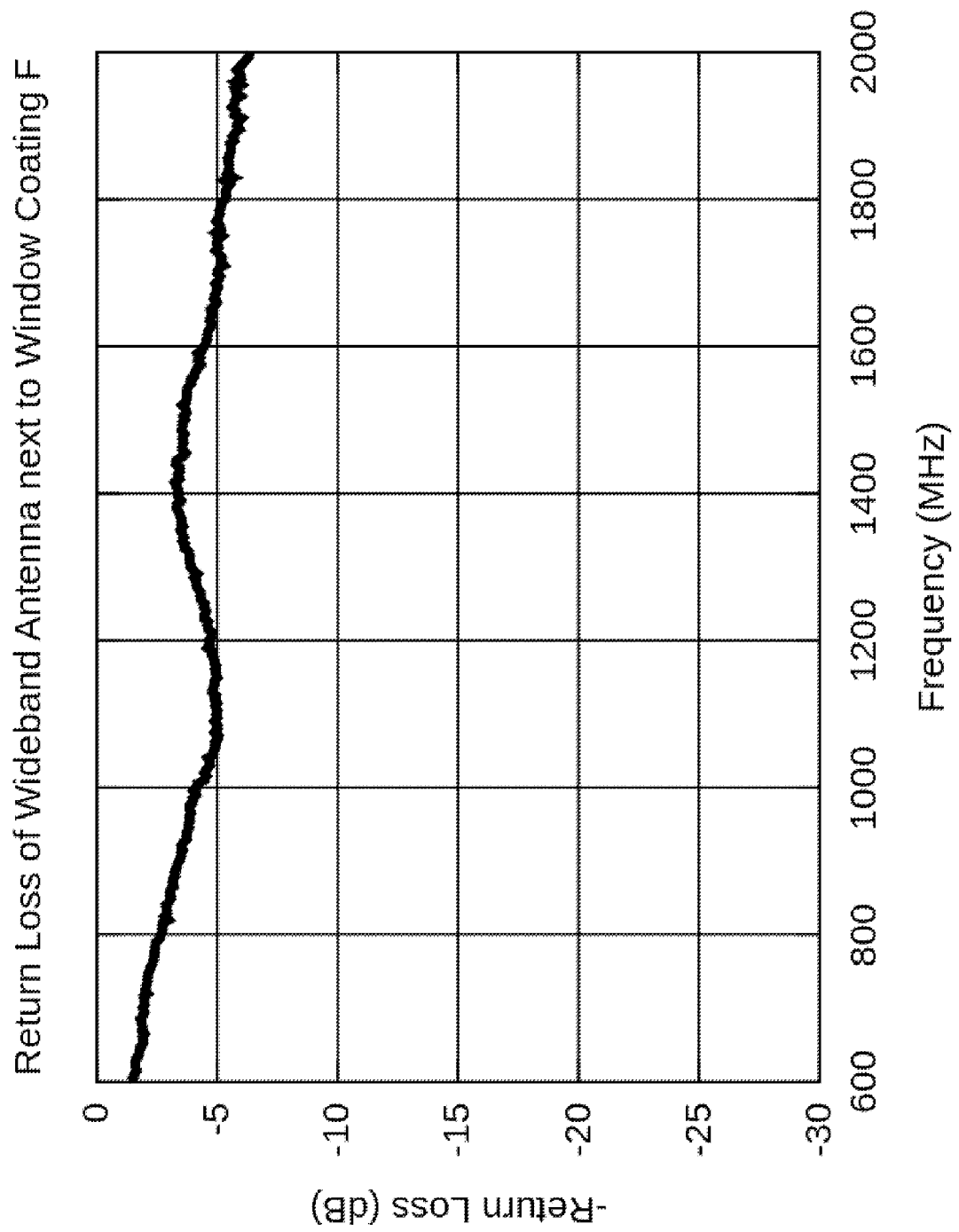
Figure 11A:
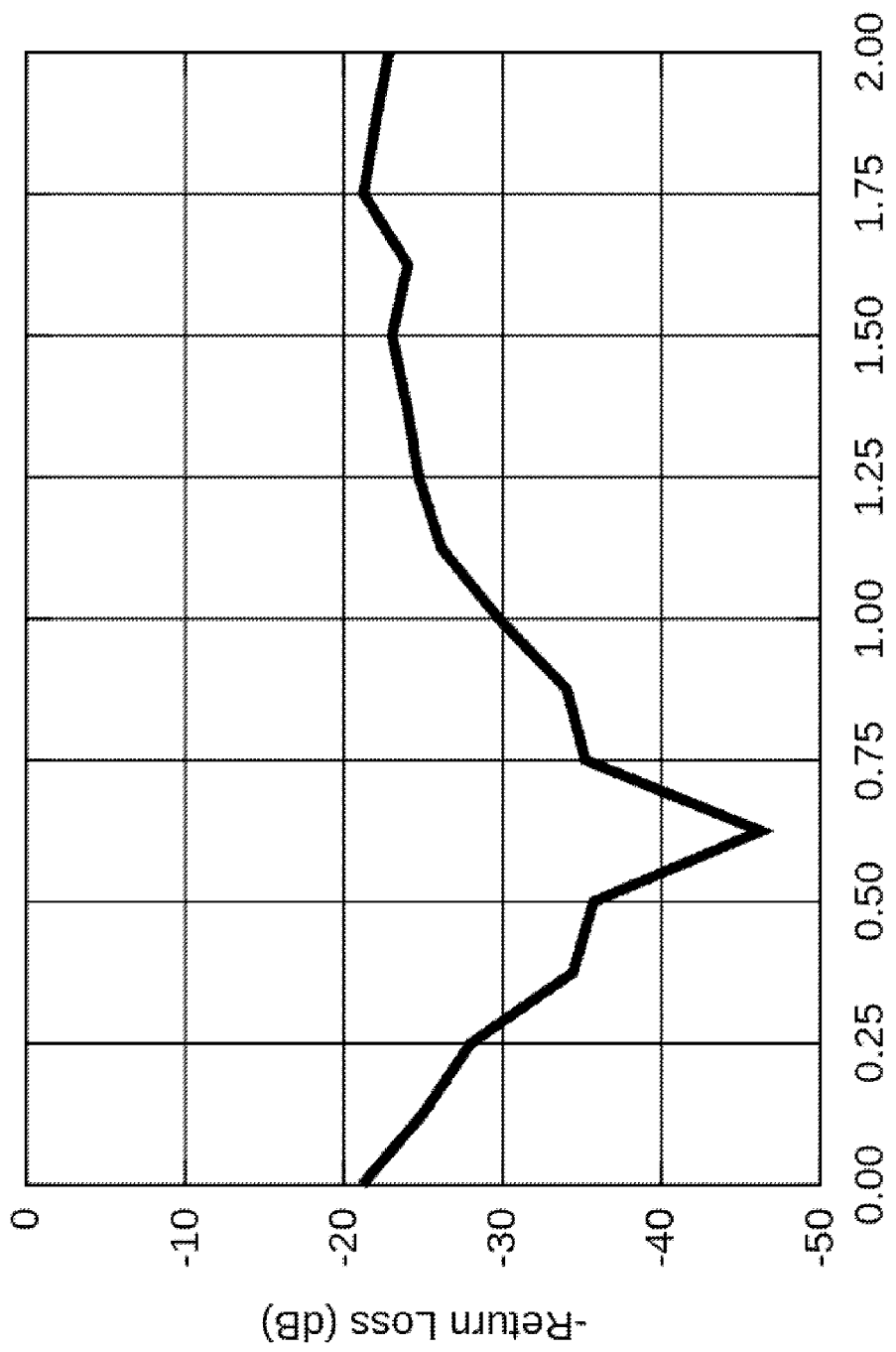
FIGS. 11a-11d illustrate return loss values for a single frequency versus distance between a wideband antenna and various materials.
Figure 11B:
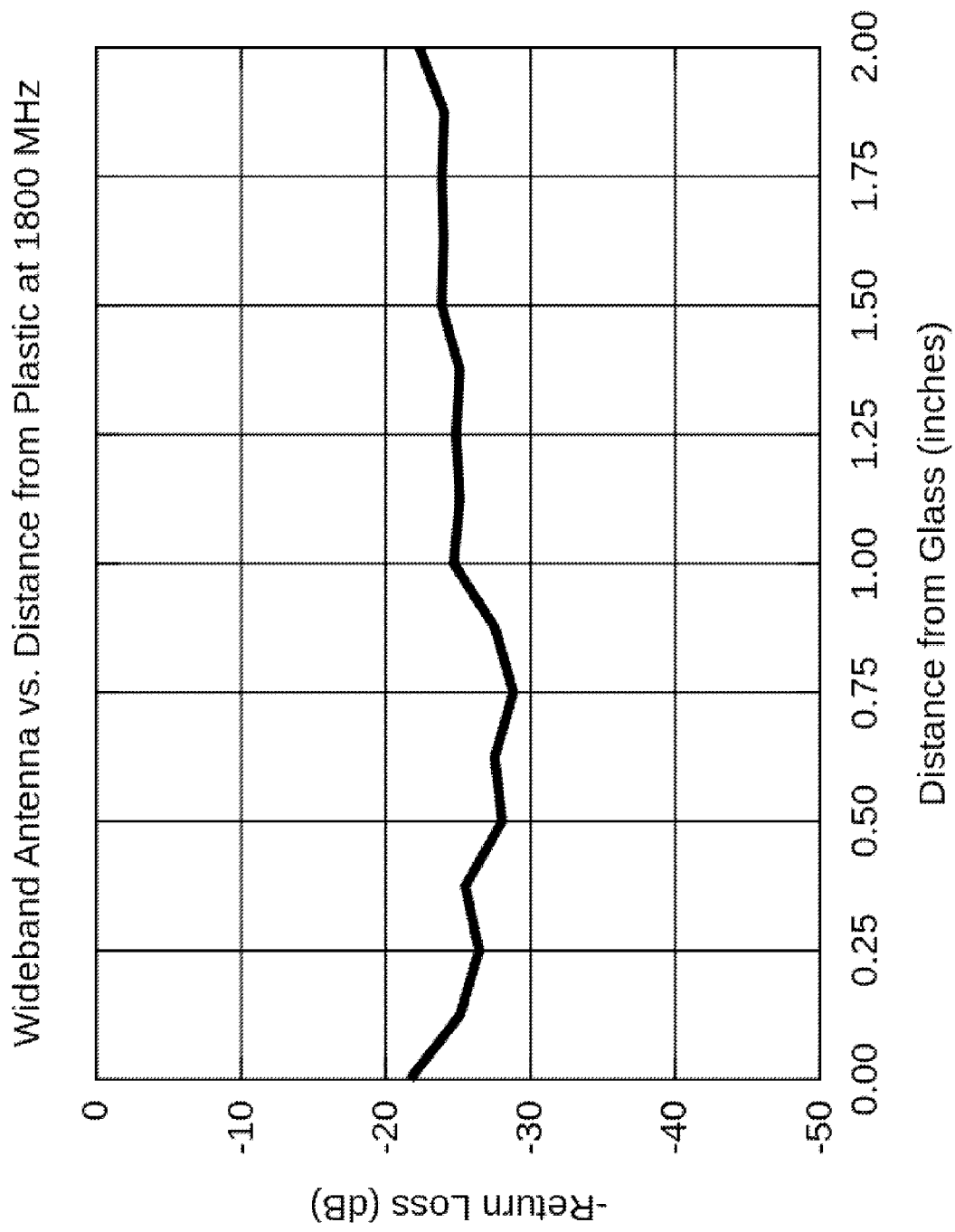
Figure 11C:
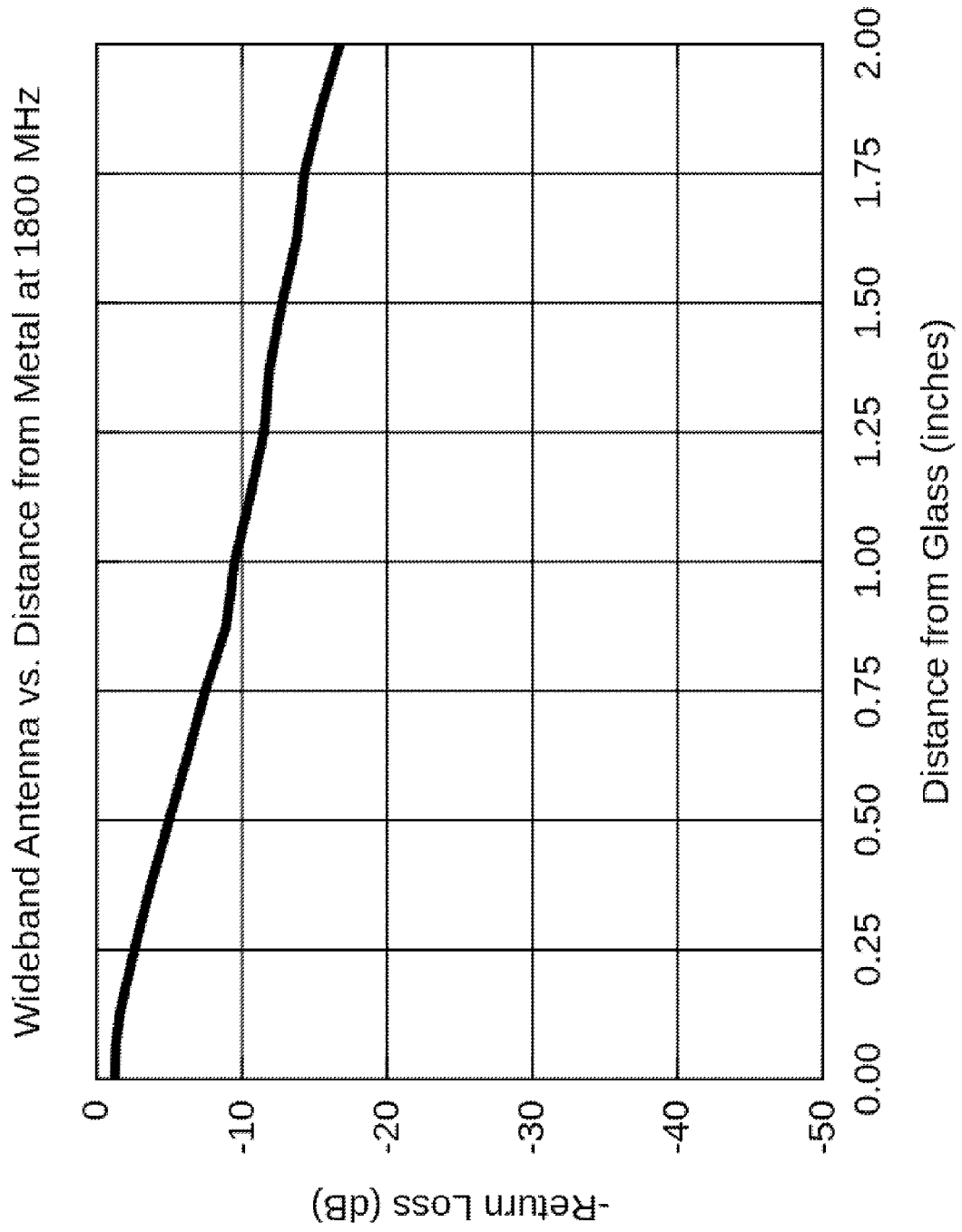
Figure 11D:
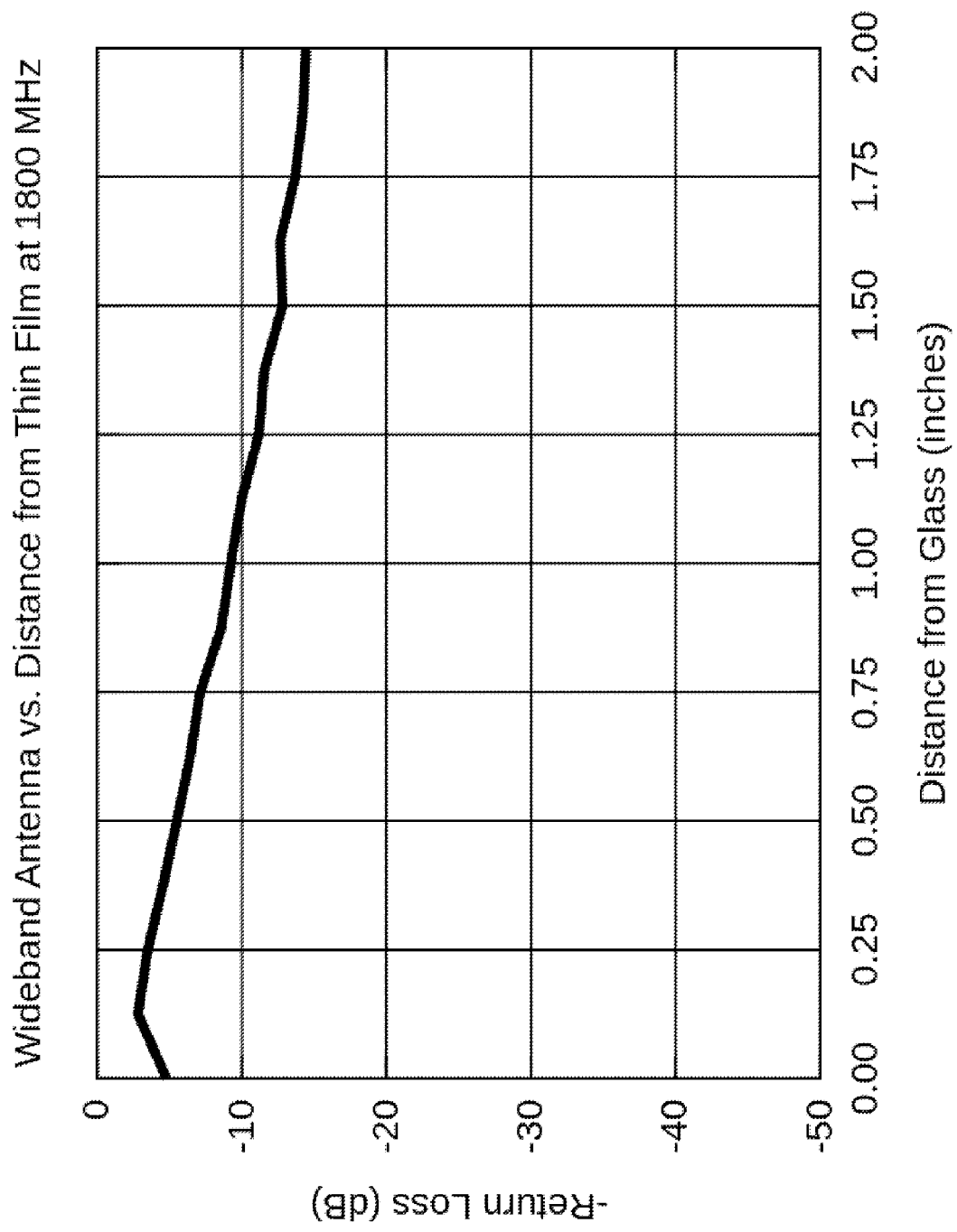

Although, in theory, the principles of this invention function at any radio frequency, the dimensions of a hand-held embodiment of the invention constrain the choice of electromagnetic wavelengths between short enough to yield a half-wavelength antenna sufficiently small to fit into a hand-held unit, and long enough to ensure that the material being tested is within a quarter wavelength of the antenna. Thus, the circuit needed to implement the detection system preferably includes an RF oscillator (an example of which is shown in FIG. 7) with a radio frequency between about 900 MHz and about 3000 MHz. A frequency below about 900 MHz has a longer wavelength that requires a larger wideband antenna and thus, a larger hand-held unit. Longer wavelengths may also interact with nearby conductors not associated with the material being tested making it more difficult to accurately target the material being tested. A frequency above about 3000 MHz has a shorter wavelength and thus, less detection range, which makes detection of conductive films through thick or multi-pane windows, for example, more difficult. The final choice of wavelength, and thus frequency, represents a compromise between the size of the hand-held device and detection range. One specific frequency may not cover all testing situations, thus the skilled artisan may tailor the frequency and wavelength for specific testing purposes and environments.

In view of the preferred frequency range, the inventive methods and products rely on short wavelength electromagnetic fields (EMF) and their interactions with conductive objects to discern the presence of a conductor. The use of short wavelength EMFs focuses the detection region on the object being tested with less influence from nearby metal objects. Other magnetic field detection methods are more sensitive to nearby conductors making their use for thin film testing prone to false detection. The use of higher frequencies and shorter wavelengths in the inventive methods and products facilitate a smaller near-field region, thus reducing interference from metallic objects in close proximity and allowing for the detection of conductive materials contained within, on, or under dielectric materials. The detuning effect of the dielectric material on the antenna in the inventive detector does not generate false positives.

As illustrated in FIG. 1, components of the inventive device include, but are not limited to: a power source (1), such as a battery, USB cable, cigarette lighter power cord, or wall-wart plug; an activation mechanism (2), such as a press button, switch, or other on/off mechanism; the necessary components to send and receive a radio frequency, e.g., transmitter, such as an RF generator (4), wideband antenna (9), and RF detector (7); and an indicator (8), such as a light or a meter, to, for example, indicate whether a radio frequency was received and, if desired and depending on the indicator, the strength of the radio frequency received. An RF circulator (5) is also a preferable component so that the device needs only a single antenna. A directional RF splitter (13) can function in place of the RF circulator (5) as shown in FIGS. 4a, 4b, 4c, 5a, 5b, and 5c. The small number of parts required to build the detector facilitates low cost manufacturing.

Figure 6A:
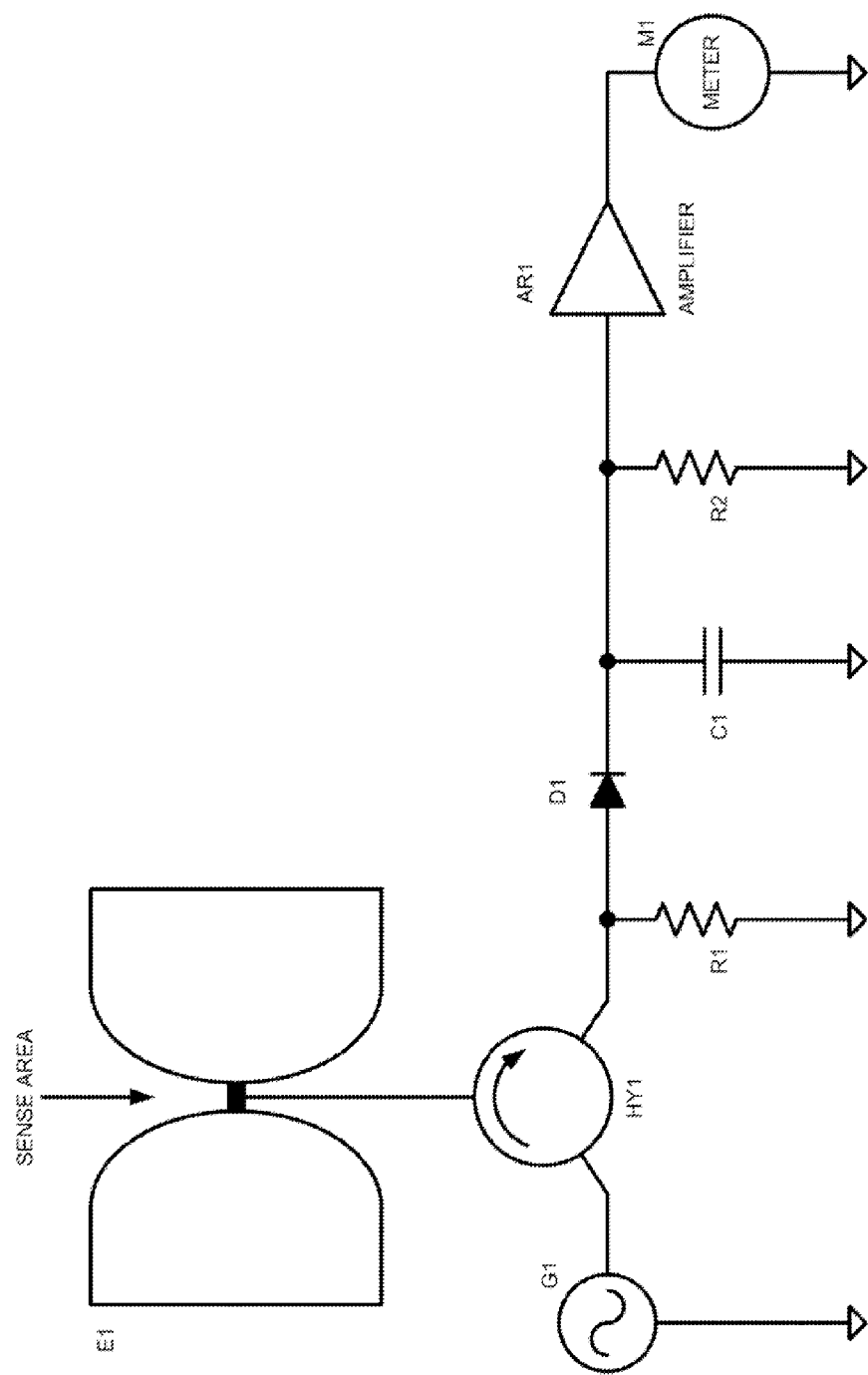
FIGS. 6a and 6b illustrate two examples of circuit design of embodiments of the inventive detector.
Figure 6B:
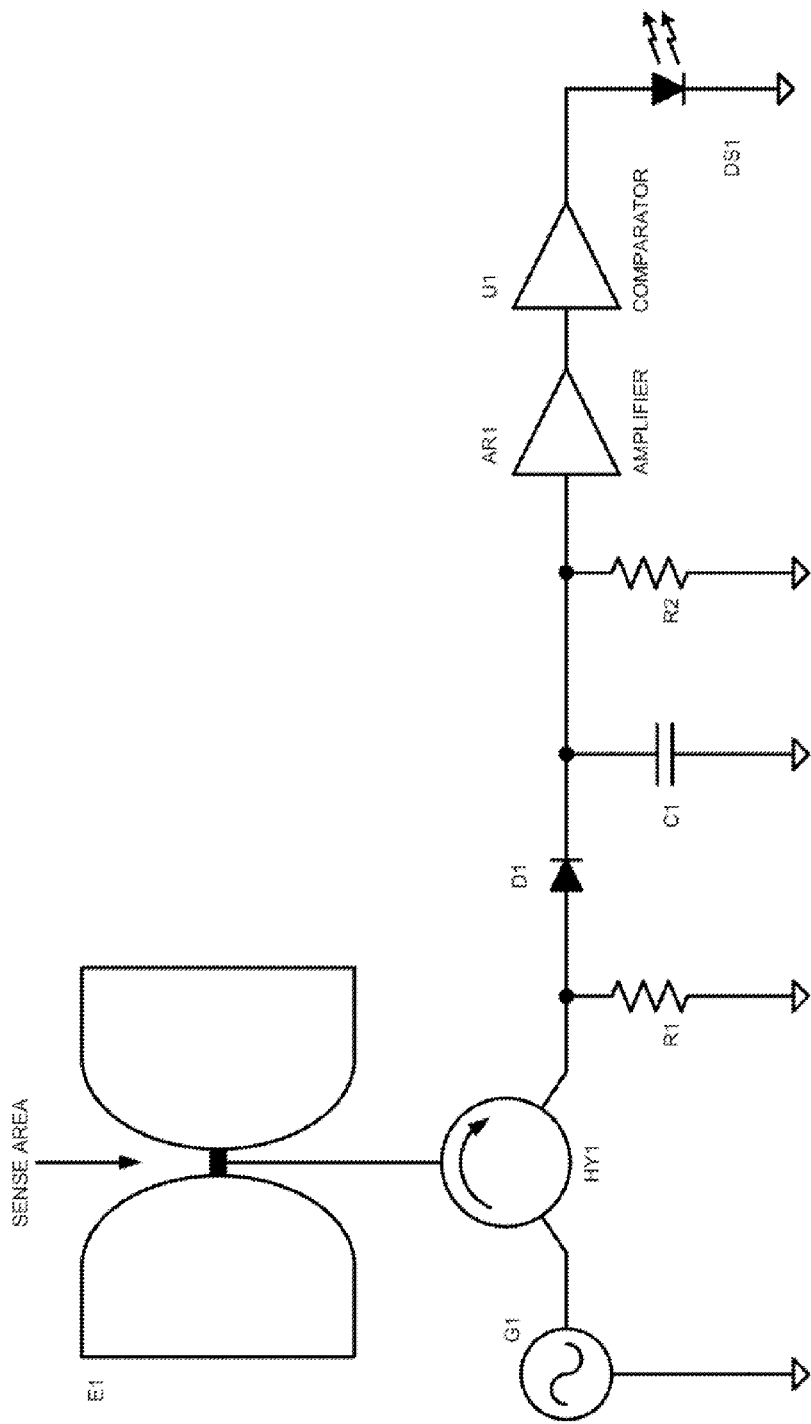

Additional preferable components include, but are not limited to: a load (6) as shown in FIG. 1 and as shown in FIGS. 6a and 6b as a 50 ohm load resistor (R1); an amplifier (AR1) as shown in FIGS. 6a, 6b, and 7; and a threshold comparator (U1) as shown in FIG. 6b. In addition, in some embodiments, the inventive detector circuitry includes, but is not limited to, one or more diodes, one or more capacitors, and one or more resistors, as illustrated in FIGS. 6a, 6b, and 7. Circuitry design and selection of required circuit components for known circuit functions are well-known to one of ordinary skill in the art.

FIG. 7 illustrates one embodiment of the circuitry that could be used in the inventive detector. In FIG. 7, voltage from a battery (BT1) is applied to a switch (S1), which functions as an activation mechanism. When closed, the switch (S1) applies voltage to a regulator (U2) and a resistor (R4) in series with an LED (DS1) in series with common ground. The resistor (R4) and LED (DS1) provide the operator with the power-on status of the circuit. The regulator (U2) clamps the voltage from the battery (BT1) to a stable 5 volts dc. A capacitor (C5) bypasses power surges to common ground and stabilizes the regulating action of the regulator (U2). The regulator (U2) supplies 5 volts dc to all other loads in the circuit.

An RF oscillator (U1) and surrounding components comprise a single frequency oscillator sine wave source. Another capacitor (C1) bypasses internal circuitry of the RF oscillator (U1) to common ground. The voltage divider, comprised of a resistor (R1) in series with 5 volts dc and a resistor (R2) in series with common ground, sets a steady TUNE voltage applied to the TUNE input of the RF oscillator (U1), thereby setting the frequency of oscillation at a fixed value. Another resistor (R3) in series with 5 volts dc sets the RF oscillator (U1) into the operative state.

Two capacitors (C2) (C3), each in series with ground, bypass the 5 volts dc power applied to the power input pins 5 and 6 (VCC1) (VCC2) of the RF oscillator (U1). Pins 3 and 8 of the RF oscillator (U1) connect to common ground. The RF sine wave output of the RF oscillator (U1) feeds an RF amplifier (AR1). A capacitor (C4), in series with common ground, the printed circuit board materials, and board trace dimensions, compensates for impedance irregularities of output pin 7 of the RF oscillator (U1) and pin 1 of the RF amplifier (AR1). Three additional capacitors (C7) (C8) (C9), which are in parallel then in series with common ground, in series with an inductor filter (L1), apply 5 volt dc power to pin 3 of the RF amplifier (AR1). Pin 2 of the RF amplifier (AR1) connects to common ground. Another capacitor (C6), in series with common ground, the printed circuit board materials, and board trace dimensions, compensates for impedance irregularities of output pin 7 of the RF amplifier (AR1), a series capacitor (C10), and pin 1 of the circulator (HY1). The series capacitor (C10) prevents the 5 volt dc power supply voltage from flowing to the circulator (HY1). The circulator (HY1) routes power input from any pin to the next clockwise pin.

The RF sine wave from the RF amplifier (AR1) is applied to pin 1 of the circulator (HY1), which routes the sine wave energy to pin 2 of the circulator (HY1). The RF energy from pin 2 of the circulator (HY1) flows to a wideband antenna (E1). Any reflected energy from the wideband antenna (E1) flows to pin 2 of the circulator (HY1). Due to the clockwise flow through the circulator (HY1), the energy from the wideband antenna (E1) flowing into pin 2 of the circulator (HY1) flows to pin 3 of the circulator (HY1) in series with a resistor (R5). The resistor (R5) properly terminates the transmission line between pin 3 of the circulator (HY1) and the pad of the resistor (R5) into its characteristic impedance. The voltage induced on the resistor (R5) is applied to the diode detector (D1) in series with another capacitor (C11) in series with ground. The diode detector (D1) rectifies the voltage such that only the positive halves of the RF ac voltage on the resistor (R5) pass, which results in a continuous positive voltage pulse stream. The capacitor (C11) filters the positive voltage pulse stream to common ground yielding a steady dc voltage in proportion to the RF energy from pin 3 of the circulator (HY1). The junction of the diode detector (D1) and the capacitor (C11) is in series with another resistor (R6) in series with common ground. This resistor (R6) ensures that the capacitor (C11) discharges when the voltage on the other resistor (R5) wanes.

The dc voltage from the diode detector (D1), the capacitor (C11), and the resistor (R6) flows to the positive input pin 3 of an operational amplifier (U3). Another capacitor (C12) in series with common ground and connected to pin 5 of the operational amplifier (U3) bypasses the 5 volt dc supply to the operational amplifier (U3). Pin 2 of the operational amplifier (U3) connects to common ground. The inverting input pin (pin 4), of the operational amplifier (U3) is in series with a resistor (R7) in series with common ground. Another resistor (R8) is connected between the output pin (pin 1), and inverting input pin (pin 4), of the operational amplifier (U3). These two resistors (R7) (R8) together configure the operational amplifier (U3) into a non-inverting voltage amplifier. The voltage on pin 3 of the operational amplifier (U3) appears at pin 1 of the operational amplifier (U3).

The amplified voltage from the operational amplifier (U3) is then applied to another resistor (R9) in series with the collector and base of a transistor (Q1) in parallel with the base of a second transistor (Q2). The emitter of the first transistor (Q1) is in series with a resistor (R10) in series with common ground. The previous resistor (R9) changes the voltage from the operational amplifier (U3) to a current. 5 volts dc is in series with another resistor (R11) in series with a second LED (DS2) in series with the collector of the second transistor (Q2). The emitter of the second transistor (Q2) is in series with another resistor (R12) in series with common ground.

The current from the resistor (R9) is applied to the two transistors (Q1) (Q2) arranged in the current mirror configuration. The current from this resistor (R9) flows into the collector of the first transistor (Q1) and the bases of both transistors (Q1) (Q2). The resistors (R10) (R12) connect the emitters of the two transistors (Q1) (Q2) to common ground and compensate for manufacturing variances of the two transistors (Q1) (Q2). The collector of the second transistor (Q2) sinks a current proportional to the current flowing through the resistor (R9). The current through the second transistor (Q2) flows though the second LED (DS2) and the resistor (R11). This resistor (R11) sets an upper limit to the current flowing through the second LED (DS2). The current flowing through the second LED (DS2) illuminates in proportion to the current value. The light intensity of the second LED (DS2) is proportional to the voltage appearing on the resistor (R5), which is proportional to the power reflected from the wideband antenna (E1), giving the operator an indication of the power reflected from the wideband antenna (E1).

The circuitry of embodiments of the inventive detector is not limited to the description above and the illustration in FIG. 7. The description above and FIG. 7 are directed to one embodiment. One of ordinary skill in the art will be able to complete a circuit with the necessary components to achieve the characteristics of the inventive detectors.

The antenna in the inventive detectors and methods of use is designed to function in freespace at the desired radio frequency, as well as against materials with a high dielectric constant, such as windshield glass. The natural frequency of an antenna shifts when brought near a dielectric material. If the antenna is of a typical narrowband design, the antenna's optimal frequency will shift outside its operating bandwidth. Thus, a narrowband antenna introduces a detuning bias into the return energy magnitude. This concept is illustrated in FIGS. 2a-2d and FIGS. 4a-4c. Anticipating this behavior, a preferred embodiment of the inventive device includes an antenna design with bandwidth exceeding the deviation caused by local dielectric materials. In this way, the influence of windshield glass, for example, on the return signal magnitude is minimal as illustrated in FIGS. 3a-3d and FIGS. 5a-5c.

Thus, the optimal, and preferred, antenna is a wideband antenna. Preferably, the antenna is a wideband monopole or dipole antenna. More preferably, the antenna is a wideband, flared, monopole or dipole antenna. Even more preferably, the antenna is a wideband, flared, monopole or dipole antenna with a frequency range of about 900 MHz to about 3000 MHz.

Upon activation, the inventive device sends out a radio frequency signal that will largely pass through dielectric materials, such as glass and plastic, but will be reflected by conductive materials, such as metal. By detecting the amount of reflected radio frequency, the device can detect whether a given material, such as a thin film, contains a conductive material, such as metal. The incorporation of a wideband antenna in the inventive device allows the radio frequency to pass through glass, plastic, and other dielectric materials, and the inclusion of a short wavelength for the device's radio frequency prevents the device from picking up frequencies reflected from other conductive materials that may be nearby, which avoids the issue with false positives. Data illustrating how the inventive methods function are shown in the graphs in FIGS. 8-11d.

In one embodiment of the operation of the inventive device, a transmitter, e.g., RF generator, drives a wideband antenna through an RF circulator. Any reflections from the antenna are directed through the circulator to a threshold detection circuit. An LED or other indicator turns on when the reflection rises above the threshold level, indicating the presence of a conductor, such as would be found in metallic thin film.

In another embodiment of the operation of the inventive device, an operator would use the detector by turning on the activation button, switch, or other mechanism, to activate the device's circuitry. The operator would then verify that the indicator, e.g., light or meter movement, shows little to no signal. The operator would then maneuver the device toward the object with the thin film being tested and, preferably, place the device flat against the object. The device would then send out a radio frequency that would either mostly pass through the material (if there is little or no metal present) or would be reflected by the material (if the material contains metal). If some of the radio frequency is reflected, then the device would pick up the reflected radio frequency and measure it. An indicator, e.g., light or meter movement, would show if enough radio frequency is detected to signify the presence of metal. For example, if the detection indicator is an LED, then the LED would light up if enough radio frequency is detected. The indicator could also be a meter, which would give a more precise idea of how much radio frequency is detected. By viewing the indicator, the operator using the device would be able to discern if the object being tested has a metallic thin film.

In a preferred embodiment of the inventive conductive thin film detector, a power source, such as a battery, is connected to an RF oscillator through a power switch. Once activated by the operator, power flows to the RF oscillator and amplifier circuit, which generates microwave energy and applies it to the first port of a three-port RF circulator. RF energy flows through the circulator to the second circulator port and then routes to an antenna. RF energy emits from the antenna and strikes the material being tested. If the material is conductive, energy bounces back into the antenna and arrives at the second port of the circulator. The circulator routes this return RF energy to port three where it is applied to a load. An RF detection circuit detects the RF voltage applied across the load and modifies it to a voltage level that indicates the signal strength of the energy reflected from the material being tested. Finally, if the sensed RF return energy exceeds a threshold, an indicator alerts the operator to the presence of a conductor near the antenna.

In another embodiment of the invention, one skilled in the art could replace the RF circulator with a directional coupler. The sensed return RF energy would be at least ten times weaker than the circulator approach, but the net result would be similar because the RF energy reflected back from the antenna would convey the same information about the conductor, dielectric, or combination of the two, as with the RF circulator.

In another embodiment, an alternative operator interface could replace the indicator light with an analog magnitude display, such as a mechanical meter or row of progressive lights. This can provide the operator with additional insight into the properties of the conductive material being tested. This analog display could be used instead of or in addition to the simple "yes" or "no" indicator.

In another embodiment, one skilled in the art could use the inventive methods and products when there is a need to measure power reflected by an antenna. By removing the wideband antenna from the invention and connecting the remaining port to an antenna being tested, the invention provides the operator with a quick indication of the antenna's capability of radiating radio frequency energy at the selected frequency.

It is to be appreciated that the Detailed Description section is intended to be used to interpret the claims. The Summary, Abstract, Brief Description of the Drawings, and Detailed Description sections set forth one or more, but not all, exemplary embodiments of the present invention as contemplated by the inventors, and thus, are not intended to limit the present invention and the appended claims in any way.

The foregoing description of the specific embodiments will so fully reveal the general nature of the invention that others can, by applying knowledge within the skill of the relevant art(s), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein, and in light of the knowledge of one skilled in the relevant art(s).

The breadth and scope of the present invention should not be limited by any of the above-described exemplary embodiments, but should be defined only in accordance with the following claims and their equivalents.

What is claimed is:

1. A method of detecting whether conductive material is present in a thin film, comprising:
   a. generating a single radio frequency using a transmitter;
   b. guiding the generated radio frequency signal to a wideband antenna port;
   c. transmitting the radio frequency signal using the wideband antenna to transmit the signal;
   d. guiding the radio frequency signal flowing from the wideband antenna to a radio frequency detector;
   e. converting the radio frequency signal to a viewable signal strength indicator; and
   f. determining, based on the output from the signal strength indicator, whether the thin film is a conductive thin film, wherein the thin film is in the vicinity of non-conductive dielectric material and wherein the non-conductive dielectric material generates negligible change in the performance of the wideband antenna such that the presence of conductive material can be detected.

2. The method of detecting as claimed in claim 1, wherein the generated radio frequency signal is guided to the wideband antenna port through a radio frequency circulator.

3. The method of detecting as claimed in claim 1, wherein the radio frequency signal flowing from the wideband antenna is guided to the radio frequency detector through a radio frequency circulator.

4. The method of detecting as claimed in claim 1, wherein the signal strength indicator is a light emitting diode.

5. The method of detecting as claimed in claim 1, wherein the signal strength indicator is the movement of a meter that measures signal strength.

6. The method of detecting as claimed in claim 5, wherein the radio frequency detector is in series with a comparator for detection of signal strength above a set threshold.

7. A method for detecting the presence of conductive material in the vicinity of non-conductive dielectric material, comprising:
   a. employing a system, comprising: a single source of radio frequency energy coupled to a radio frequency directional router coupled to a wideband antenna; a radio frequency detector; and a signal detection indicator;
   b. generating a single radio frequency signal from the single source of radio frequency energy;
   c. guiding the radio frequency signal generated from the single source through the radio frequency directional router to a wideband antenna;
   d. radiating the radio frequency signal from the wideband antenna, wherein the wideband antenna is of sufficient bandwidth such that the non-conductive dielectric material generates negligible change in the performance of the wideband antenna;
   e. guiding the radio frequency signal reflected from the wideband antenna to the radio frequency detector through the radio frequency directional router;
   f. converting the radio frequency signal from the radio frequency detector to a signal strength viewable through the signal detection indicator; and
   g. assessing, based on the indicator, whether conductive material is present.

8. The method for detecting as claimed in claim 7, wherein the wideband antenna is a flared monopole or dipole antenna and has a frequency range of about 900 MHz to about 3000 MHz.

9. A device for sensing the presence of a conductive thin film, comprising: a power source, an actuator switch, a radio frequency oscillator, a radio frequency amplifier, a radio frequency circulator having a first clockwise port and a second clockwise port, a wideband antenna, a termination load, a radio frequency detector, and a detection indicator;
   wherein the power source is in series with the actuator switch;
   wherein the actuator switch is in series with the radio frequency oscillator and in series with the radio frequency amplifier;
   wherein the radio frequency amplifier is in series with the radio frequency circulator;
   wherein the first clockwise port of the radio frequency circulator is in series with the wideband antenna and the second clockwise port of the radio frequency circulator is in series with the termination load;

wherein the termination load is in series with the radio frequency detector; and wherein the radio frequency detector is in series with the detection indicator; and wherein the wideband antenna provides the device with immunity to dielectric loading from non-conductive material in the vicinity of conductive thin film.

10. The device of claim 9, wherein the radio frequency detector comprises an integrated circuit assembly.

11. The device of claim 9, wherein the detection indicator detects the presence of conductive material.

12. The device of claim 9, wherein the detection indicator is a light emitting diode or a meter movement.

* * * * *